US012781550B2

(12) United States Patent
Kumar et al.

(10) Patent No.: US 12,781,550 B2
(45) Date of Patent: Nov. 3, 2026

(54) DOOR SECURITY DEVICE

(71) Applicants: Rohan Kumar, Berkeley Lake, GA (US); William Susskind, Peachtree Corners, GA (US)

(72) Inventors: Rohan Kumar, Berkeley Lake, GA (US); William Susskind, Peachtree Corners, GA (US)

( * ) Notice: Subject to any disclaimer, the term of this patent is extended or adjusted under 35 U.S.C. 154(b) by 32 days.

(21) Appl. No.: 18/431,920

(22) Filed: Feb. 2, 2024

(65) Prior Publication Data

US 2025/0250832 A1 Aug. 7, 2025

(51) Int. Cl.
*E05C 19/00* (2006.01)
*E05C 21/00* (2006.01)

(52) U.S. Cl.
CPC ............ *E05C 19/003* (2013.01); *E05C 21/00* (2013.01)

(58) Field of Classification Search
CPC ............... E05B 17/005; E05B 17/2007; E05B 17/2038; E05B 63/0004; E05B 63/18; E05B 63/20; E05B 15/0093; E05B 15/0205; E05B 1/0015; E05B 2015/023; E05B 41/00; Y10T 292/34; Y10T 292/37; Y10T 292/379; Y10T 292/388; Y10T 292/546; Y10T 292/03; Y10T 292/0891; Y10T 292/096; Y10T 292/0969; Y10T 292/1022; Y10T 292/1023; Y10T 292/1028; Y10T 292/1006; Y10T 292/1007; Y10T 292/1008; Y10T 292/1009; Y10T 292/101; Y10T 292/1011; Y10T 292/1013; Y10T 292/707; E05C 19/182; E05C 19/184; E05C 19/001; E05C 19/002; Y10S 292/60; Y10S 292/68
See application file for complete search history.

(56) References Cited

U.S. PATENT DOCUMENTS

| | | | | |
|---|---|---|---|---|
| 684,000 A * | 10/1901 | Shore | E05C 19/182 | 292/293 |
| 915,851 A * | 3/1909 | Goodwin | E05B 57/00 | 292/DIG. 68 |
| 1,086,365 A * | 2/1914 | Hendren | E05B 63/128 | 292/341.15 |
| 2,630,005 A * | 3/1953 | Raivetz | E05B 63/18 | 70/447 |

(Continued)

FOREIGN PATENT DOCUMENTS

| | | | | |
|---|---|---|---|---|
| DE | 9412827 U1 * | 11/1994 | | |
| DE | 202015005923 U1 * | 10/2015 | E05C 19/182 | |

(Continued)

*Primary Examiner* — Carlos Lugo
(74) *Attorney, Agent, or Firm* — Wilmer Cutler Pickering Hale and Dorr LLP

(57) ABSTRACT

Methods, systems, and apparatus for a door security device. The device can include a first rail member having an elongated portion and a second rail member having an elongated portion. The device can also include a body member having a plurality of surfaces and a recess defined by one or more surfaces of the plurality of surfaces, where the recess is configured to interact with the first rail member and/or second rail member in a slidable arrangement. The device can also include a plate member secured to the body member. The device can also include an interactive member secured to one or more of the plate member and the body member.

19 Claims, 18 Drawing Sheets

(56) References Cited

U.S. PATENT DOCUMENTS

| | | | | | |
|---|---|---|---|---|---|
| 3,318,123 | A * | 5/1967 | Piazza | E05B 17/2042 | 70/447 |
| 3,733,861 | A * | 5/1973 | Lester | G07C 9/00944 | 70/277 |
| 3,773,369 | A * | 11/1973 | Wersonick | E05B 17/2023 | 292/288 |
| 3,848,908 | A * | 11/1974 | Rich | E05B 65/087 | 49/449 |
| 4,159,838 | A * | 7/1979 | Wilzig | E05B 17/2038 | 292/87 |
| 4,955,648 | A * | 9/1990 | Miller | E05C 19/18 | 292/288 |
| 5,421,627 | A * | 6/1995 | Yane | E05B 1/0015 | 292/101 |
| 5,790,034 | A * | 8/1998 | Khoury | E05B 47/0012 | 292/144 |
| 6,357,806 | B1 * | 3/2002 | Saku | B64D 11/0007 | 70/432 |
| 6,857,672 | B1 * | 2/2005 | Drew, II | E05B 15/0205 | 292/DIG. 55 |
| 7,520,152 | B2 * | 4/2009 | Sabo | E05B 63/18 | 292/144 |
| 9,303,434 | B2 * | 4/2016 | Tarquinio | E05B 63/18 | |
| 10,689,890 | B2 * | 6/2020 | Taylor | E05C 19/184 | |
| 10,893,749 | B1 * | 1/2021 | Pifer | E05B 1/0015 | |
| 11,434,674 | B2 * | 9/2022 | Goss | E05B 63/0004 | |
| 2015/0007623 | A1 * | 1/2015 | Alghamdi | E05C 1/04 | 292/137 |
| 2015/0097383 | A1 * | 4/2015 | Busse | E05B 17/005 | 292/289 |
| 2020/0046582 | A1 * | 2/2020 | Hincapie Montoya | E05C 19/168 | |

FOREIGN PATENT DOCUMENTS

| | | | | |
|---|---|---|---|---|
| EP | 0890693 | A1 * | 1/1999 | E05C 1/04 |
| WO | WO-0003108 | A1 * | 1/2000 | E05B 17/005 |
| WO | WO-2015145202 | A1 * | 10/2015 | E05B 17/2092 |

* cited by examiner

DOOR SECURITY DEVICE

TECHNICAL FIELD

The present specification relates to security systems and devices.

BACKGROUND

Schools, businesses, and various other establishments are facing unprecedented threats in degree and number, often in the form of violent trespassers who intend to harm innocent occupants of these establishments. Therefore, there exists an urgent need for enhanced security in these establishments. Traditional security measures such as locking the cylinder locks of doors suffers from a number of drawbacks. For example, such locks may require a key to both lock and unlock the door as is often the case for school classrooms. Requiring a key to secure a room severely limits the number of persons that are able to secure the room in an emergency situation, and the act of using a key to secure a room requires a significant amount of time relative to the time that may be available in an emergency situation and presents a difficult task to perform under stress which emergency situations often induce. Even doors that do not require a key to lock suffer from a number of drawbacks. For example, such doors are often left unlocked to allow occupants to travel between different rooms. Therefore, when an emergency situation arises, the door must be locked. It can be difficult to tell if such doors are locked from a distance or without moving the door knob or handle. As such, determining whether such a door is locked, may put occupants at greater risk as it could require them to move closer to the door to determine if the door is locked, make noise to test whether the door is locked, or both.

Others have attempted to address at least some of these issues using, for example, magnetic strips or additional locks. However, these are only partial solutions that suffer from one or more of the drawbacks, such as wearing out quickly, hindering emergency access, from one or more of the drawbacks described above, or a combination thereof.

For at least these reasons, there exists a need for a reliable and convenient device to quickly secure doors in an emergency situation.

SUMMARY

A door security device is described herein. The door security device integrates with existing doors and door locks to provide an easy-to-use security system designed to quickly and securely lock doors in schools, offices, and other establishments during emergencies. For example, after installation, the door security device allows occupants to activate a locking mechanism with a single action, eliminating the need for complex or time-consuming processes. The door security device can be placed in an upper, unsecure position to allow occupants to use the door as normal. In this upper position, the existing door lock of the door is locked but the door security device blocks the latch of the door lock, allowing the door to be opened and closed as if the door were not locked. However, during an emergency or emergency drill, the door security device can be quickly and easily placed in a lower, secure position. In this position, the latch of the existing door lock is unblocked so that it is permitted to enter a corresponding opening in a strike plate installed on the door frame, thereby securing the door.

In some implementations, the door security device includes one or more rails. For example, a portion of the door security device can move vertically up and down along the one or more rails to secure or unsecure the door.

In some implementations, the door security device includes one or more indicators to indicate whether the door is secured or unsecured. For example, a green indicator, such as a green reflective strip or sticker, may be secured to an upper rail of the door security device such that it is revealed when the door security device is placed in the lower, secure position. As another example, a red indicator, such as a red reflective strip or sticker, may be secured to a lower rail of the door security device such that it is revealed when the door security device is placed in the upper, unsecure position.

In some implementations, the door security device is magnetically secured to a door. For example, the rails of the door security device can be made from magnetized, cast steel that secure the door security device to a steel door.

In some implementations, the door security device is secured to a door using fasteners. For example, each rail of the door security device can be secured to a door using two or more machine screws for a metal door or two or more wood screws for a wood door. As another example, each rail of the door security device can be secured to a door using one or more bolts that pass through the thickness of the door.

In some implementations, the door security device is motorized. For example, the door security device can include an electronic motor and a belt drive mechanically coupled to the motor. When the motor is activated, the door security device can be moved to its lower position to secure the door.

A number of benefits are realized by the door security device. For example, the design and configuration of the device is such that it can be retroactively installed on many existing doors, such that a new door, lockset, and/or door frame are not required. Additionally, the design and configuration of the device is such that, for example, it is compliant with building and fire code requirements. In more detail, the device can be installed on an existing door with a lockset that already meets building and fire code requirements. The design and configuration of the device is such that, for example, it does not interfere with first responders' or other emergency personnel's ability to gain access to a room with the door security device during or after an emergency event. Finally, the design and configuration of the device is such that, for example, it can be easily operated by persons in the room to quickly secure the room with one hand during emergency or high stress events.

In one general aspect, a device to secure a door includes a first rail member having an elongated portion and secured to a door; a second rail member having an elongated portion and secured to the door; a body member having a front surface, a back surface, a top surface, a bottom surface, and a recess (i) defined by the back surface and one or more of the top surface and the bottom surface and (ii) configured to interact with the first rail member and/or the second rail member in a slidable arrangement; a plate member secured to the body member, the plate member having a through-hole or notch configured to permit at least a portion of a bolt of a lock of the door to pass through the through-hole or the notch; and an interactive member secured to one or more of the plate member and the body member, the interactive member configured to move the plate member and the body member along the first rail member and the second rail member in response to a force applied to the interactive member having a component parallel to an axis of the body member that passes through the top surface and the bottom surface of the body member.

Implementations, include one or more of the following features. For example, in some implementations, the elongated portion of the first rail member has a substantially uniform cross-section; and the elongated portion of the second rail member has a substantially uniform cross-section.

In some implementations, the elongated portions of the first and second rail members are shaped such that front surfaces of the elongated portions have a greater width than back surfaces of the elongated portions; and the back surfaces of the elongated portions are opposite the front surfaces and contact the door.

In some implementations, a cross section of the elongated portion of the first rail member is trapezoidal in shape; a cross section of the elongated portion of the second rail member is trapezoidal in shape; a cross section of the first recess of the body member is trapezoidal in shape; and a cross section of the second recess of the body member is trapezoidal in shape.

In some implementations, a length of the body member from the top surface of the body member to the bottom surface of the body member is larger than a width of the body member.

In some implementations, the through-hole of the plate member is configured to permit at least a portion of a bolt of a door lock to pass through the through-hole when the body member and the plate member are positioned in a lower position such that the elongated portion of the second rail member substantially fills the second recess of the body member; and the plate member is configured to prevent any portion of a bolt of a door lock to pass through the plate member when the body member and the plate member are positioned in an upper position such that the elongated portion of the first rail member substantially fills the first recess of the body member.

In some implementations, the plate portion includes a first side that contacts the front surface of the body member and a second side that contacts a side surface of the body member, where the first side of the plate portion is substantially perpendicular to the second side to the second side of the plate portion.

In some implementations, the through-hole of the plate member is located in the second side of the plate member.

In some implementations, the plate member is formed from a single piece of material that is bent to create the first side and the second side; or the plate member is formed from two or more pieces of material where the first side is formed from a first piece of material and the second side is formed from a second piece of material.

In some implementations, at least a portion of a top surface of the plate member is substantially coplanar with a top surface of body member; and at least a portion of a bottom surface of the plate member is substantially coplanar with a bottom surface of the body member.

In some implementations, the recess continues through a length of the body member such that the recess is defined by the back, top and bottom surfaces of the body member.

In some implementations, the recess is a first recess defined by the back and top surfaces of the body member, the device further including a second recess defined by the back and bottom surfaces of the body member, where a volume of the first recess is substantially the same as a volume of the second recess; and/or dimensions of the first recess are substantially the same as dimensions of the second recess.

In some implementations, the device includes a first indicator to indicate that the body member and the plate member are positioned in a lower position; and a second indicator to indicate that the body member and the plate member are positioned in a second position.

In some implementations, the first indicator is (i) formed in or (ii) secured to a front surface of the elongated portion of the first rail member; and the second indicator is (i) formed in or (ii) secured to a front surface of the elongated portion of the second rail member.

In some implementations, the first indicator has a first color; and the second indicator has a second color different than the first color.

In some implementations, the first indicator includes text that indicates a door to which the device is attached is secure; and the second indicator includes text that indicates a door to which the device is attached is insecure.

In some implementations, the device includes a microcontroller configured to generate and/or process signals; and an actuator coupled to (i) the body member and/or the plate member and (ii) electronically coupled to the microcontroller, where the actuator is configured to change a position of the body member and the plate member with respect to the first rail member and the second rail member in response to receiving a signal from the microcontroller.

In some implementations, the device includes a transceiver electronically coupled to the microcontroller, where the transceiver is configured to receive and transmit signals, including signals generated by the microcontroller; and a sensor electronically coupled to the microcontroller configured to generate a signal in response to the body member and the plate member reaching a lower position such that the elongated portion of the second rail member substantially fills the second recess of the body member.

In some implementations, the actuator includes a motor configured to turn a shaft in response to receiving a signal from the microcontroller; a pinion torisionally coupled to the shaft of the motor; and a rack that engages the pinion, where the rack is mounted to the body member and/or the plate member.

In some implementations, the device includes a battery to power the actuator.

In some implementations, the device includes a battery to power the motor.

In some implementations, the device does not include an interactive member. For example, in implementations where the device includes one or more actuators, the device may not include an interactive member.

In some implementations, the device includes an interactive member and one or more actuators. For example, in implementations, where the device includes a motor, a rack, a pinion, and a battery to power the motor, the device may also include an interactive member to allow users to move the device from an unsecured, upper position to a secured, lower position, or to move the device from a lower position to an upper position (e.g., to prime the device).

In one general aspect, a device to secure a door includes one or more rail members having an elongated portion and secured to a door; a body member having multiple surfaces, and a recess (i) defined by a first set of one or more surfaces of the multiple surfaces and (ii) configured to interact with at least one of the one or more rail members in a slidable arrangement; a plate member secured to the body member, the plate member having a through-hole or a notch configured to permit at least a portion of a bolt of a lock of the door to pass by the plate member; a microcontroller configured to generate and/or process signals; and an actuator coupled to (i) the body member and/or the plate member and (ii) electronically coupled to the microprocessor, where the actuator is configured to change a position of the body member and the plate member with respect to the one or more rail members in response to receiving a signal from the microcontroller.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A door security device is described herein. The door security device integrates with existing doors and door locks to provide an easy-to-use security system designed to quickly and securely lock doors in schools, offices, and other establishments during emergencies. For example, after installation, the door security device allows occupants to activate a locking mechanism with a single action, eliminating the need for complex or time-consuming processes. The door security device can be placed in an upper, unsecure position to allow occupants to use the door as normal. In this upper position, the existing door lock of the door is locked but the door security device blocks the latch of the door lock, allowing the door to be opened and closed as if the door were not locked. However, during an emergency or emergency drill, the door security device can be quickly and easily placed in a lower, secure position. In this position, the latch of the existing door lock is unblocked so that it is permitted to enter a corresponding opening in a strike plate installed on the door frame, thereby securing the door.

Figure 1A:
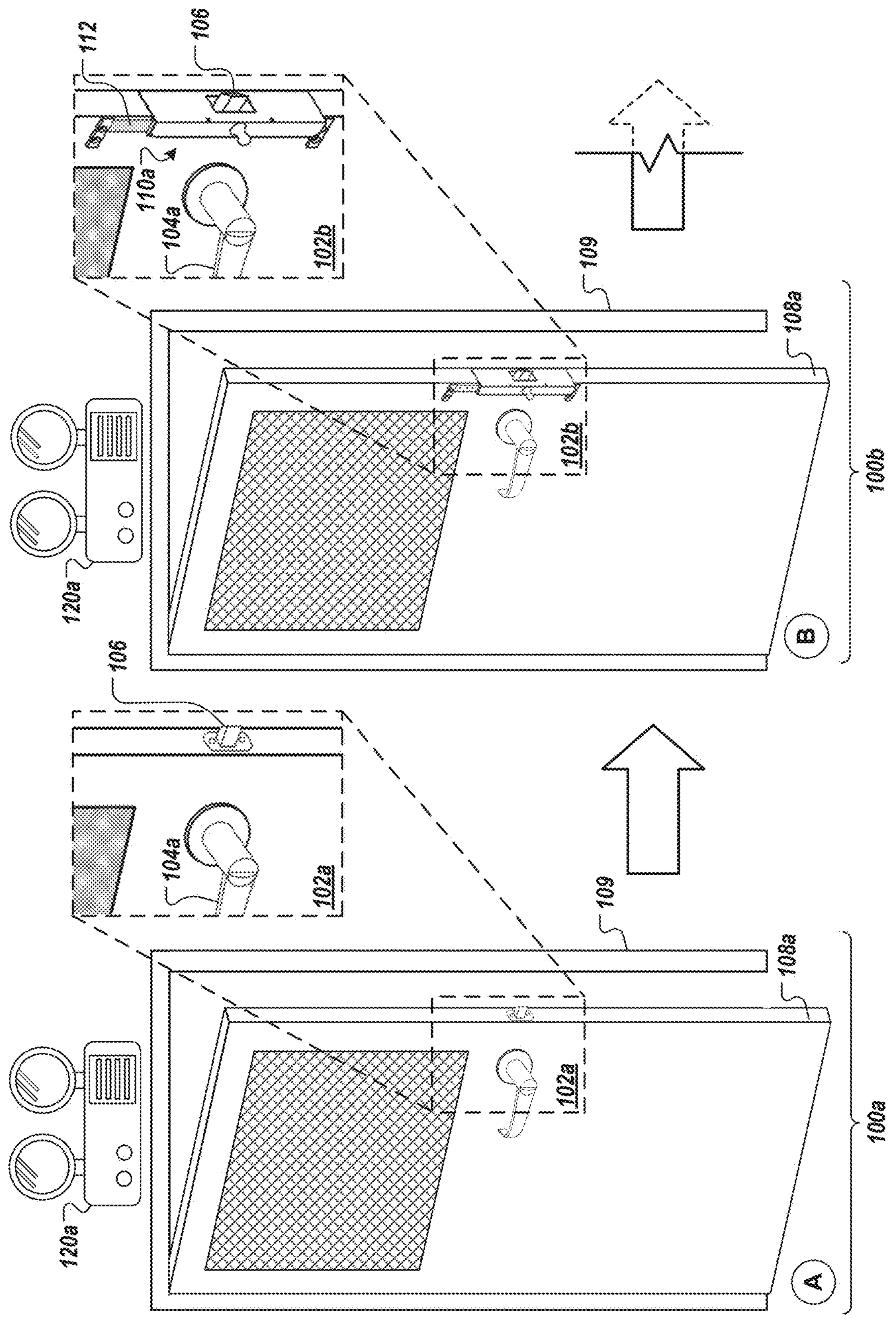
FIGS. 1A-1C is a diagram showing use of an example door security device.
Figure 1B:
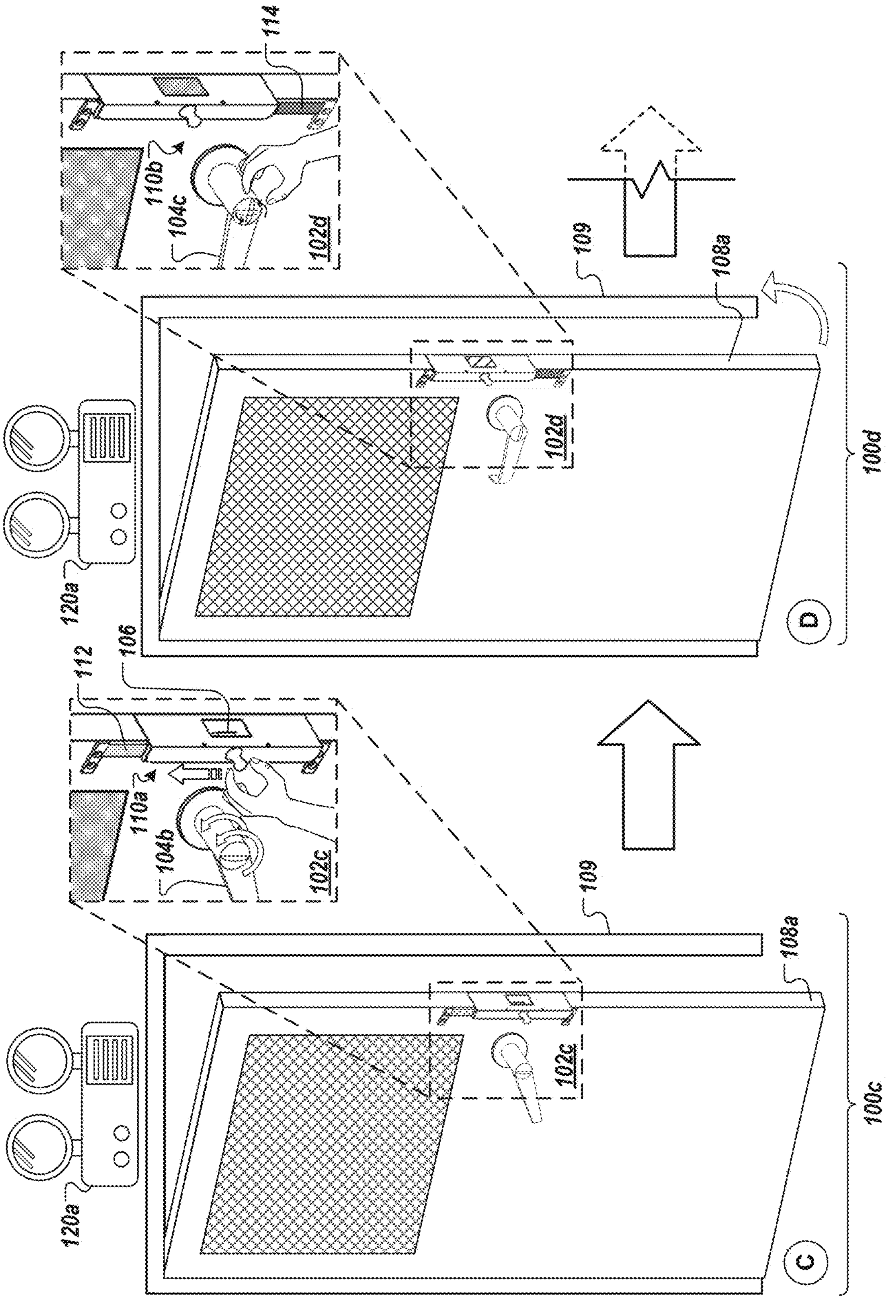
Figure 1C:
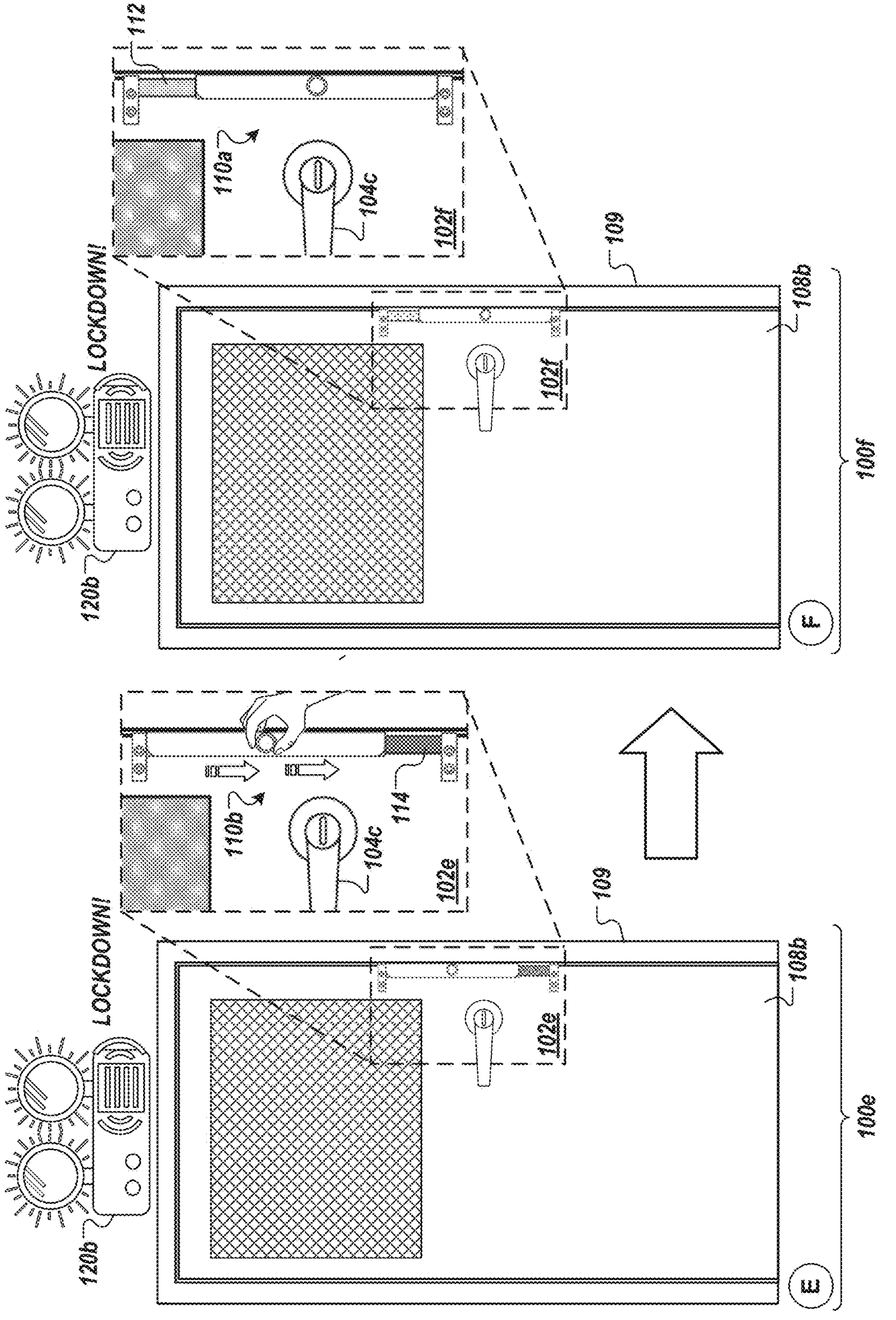

FIGS. 1A-1C is a diagram showing use of an example door security device 110. FIGS. 1A-1C depict different stages (A) through (F) for readying and using the security device 110 that is installed on a door assembly 100. As an example, FIGS. 1A-1C depict use of the door security device 110 from the perspective of an interior of a room, such as from an interior of a classroom of a school.

FIG. 1A is a diagram showing a first stage (A) and a second stage (B) for readying and using the security device 110.

In stage (A), a door assembly 100*a* is shown before the security device 110 is installed. The door assembly 100*a* includes a door 108*a* and a door frame 109. The door 108*a* is open and includes a lockset 102*a*. The lockset 102*a* includes (i) an interior handle 104*a* (e.g., lever, doorknob, etc.) installed on a first side of the door 108*a* facing towards an interior of a room and (ii) a latch 106. The handle 104*a* of the lockset 102*a* has a lock selector in an unlocked position, rendering the lockset 102*a* unlocked. As an example, the lock selector for the handle 104*a* may be a turn piece. The lockset 102*a* may also include an exterior handle (e.g., lever, doorknob, etc.) on an opposite side of the door 108*a* that faces away from the interior of the room. The exterior handle may include a lock selector in the form of a keyway (e.g., key cylinder) that, for example, requires use of a key to lock or unlock the lockset 102*a*. When in the lockset 102*a* is in an unlocked position as shown, a person is able to turn the door handle (e.g., the exterior door handle and/or the interior door handle 104*a*) to, for example, open the door 108*a*.

In some implementations, the lockset 102*a* includes a handle with a lock selector other than a turn piece. For example, the handle 104*a* may, like the exterior handle, include a lock selector in the form of a keyway (e.g., key cylinder). In more detail, the lockset 102*a* may include two, matching key cylinders, one for the exterior handle and one for the interior handle 104*a*. As another example, the handle 104*a* may include a lock selector in the form of a lock button. As another example, the handle 104 may include a lock selector in the form of a lock button with a turn piece.

In an example scenario, an example speaker 120*a* of a public address (PA) system for the building is mounted above the door frame in which the room is located. As an example, alerts may be played through the speaker 120*a* in response to different events, such as an emergency alert in response to notification of an emergency situation. The speaker 120*a* may also include one or more other components such as lights to guide occupants towards an exit or to provide back-up lighting (e.g., battery powered) if power to the building were lost. In stage (A), no alerts or other audio are played through the speaker 120*a*.

In stage (B), the door security device 110*a* is installed on the door assembly 100*b*. In more detail, the door security device 110*a* is installed on the open door 108*a* and is aligned with respect to the lockset 102*b* the latch 106 of the lockset 102*b*). After installation, the door security device 110*a* is initially placed in a lower position such that the latch 106 of the lockset 102*b* passes through an opening in a plate of the door security device 110*a*. With the door security device 110*a* in the lower position, a secure indicator 112 (e.g., a green plate or sticker) is displayed and the latch 106 is able to interact with a strike plate of the door frame 109, for example, if the door 108*a* were closed. The lockset 102*b* is in an unlocked state, with the lock selector of the interior handle 104*a* in an unlocked position.

In stage (B), no alerts or other audio are played through the speaker 120*a*.

FIG. 1B is a diagram showing a third stage (C) and a fourth stage (D) for readying and using the security device 110.

In stage (C), the door security device 110*a* is moved from a lower position to an upper position. A person may turn the interior handle 104*b* of the lockset 102*c* to bring the latch 106 at least partially into the door 108*a* of the door assembly 100*c* such that the latch 106 no longer passes through an opening in the plate of the door security device 110*a* and the plate of the door security device 110*a* is clear of the latch 106. After the latch is brought at least partially into the door 108*a* such that the plate of the door security device 110*a* is clear of the latch 106, the person lifts the door security device 110*a* (e.g., through an interactive member such as a knob) to move the door security device 110*a* into its upper position. The act of moving the door security device 110*a* from its lower position to its upper position hides the secure indicator 112 (e.g., green plate) and reveals an unsecure indicator 114 (e.g., red plate or sticker) as described in more detail below.

As an example, no alerts or other audio are played through the speaker 120*a* in stage (C).

In stage (D), the lockset 102*d* is locked while the door security device 110*b* is in the upper position to prime the door security device 110*b*. With the door security device 110*b* in the upper position, the unsecure indicator 114 (e.g., red plate or sticker) is displayed and the plate of the door security device 110*b* blocks the latch 106 of the lockset 102*d*. In this arrangement, the latch 106 is kept at least partially within the door 108*a* of the door assembly 100*d* and is prevented from interacting with a strike plate of the door frame 109, for example, if the door 108*a* were closed.

A person may interact with the interior handle 104*c* to lock the lockset 102*d*. For example, a person may interact with the lock selector to move it from an unlocked position to a locked position to lock the lockset 102*d*. In some implementations, the person turns a turn piece of the interior handle 104*c* from an unlocked position to a locked position to lock the lockset 102*d*. In some implementations, the person guides a key into a keyway of the interior handle 104*c* and turns the key to lock the lockset 102*d*. In some implementations, a person pushes a lock button of the interior handle 104*c* to lock the lockset 102*d*. In some implementations, the person pushes a lock button with a turn piece of the interior handle 104*c* and/or turns the turn piece of the lock button to lock the lockset 102*d*.

With the door security device 110*b* primed such that the door security device 110*b* is placed in its upper position and the lockset 102*d* is locked, persons are able to interact with the door 108*a* to open and close the door 108*a* as if it were unlocked. The unsecure indicator 114 is displayed to communicate to occupants of the room that the door assembly 100*d* is not secure. In addition, with the door security device 110*b* primed such that the door security device 110*b* is placed in its upper position and the lockset 102*d* is locked, an occupant of the room may quickly activate the door security device 110*b* by closing the door 108*a* and moving the door security device 110*b* to the lower position.

In some implementations, the lockset 102 includes a keyway on both an exterior handle and the interior handle 104. As an example, this may help to prevent tampering by a person (e.g., student) within the room whose rational thinking may be impaired during an emergency event. In more detail, after lockset 102 is locked using a key with the door security device 110*b* in its upper position to the prime the door security device 110*b*, the door security device 110*b* can be activated, as described in more detail below. For example, the door security device 110*b* can be activated by lowering the door security device 110*b* to permit the latch 106 of the lockset 102 to pass through the door security device 110*b* and into the door frame 109. Having a lockset 102 that requires a key to unlock can help prevent tampering as a person then requires a key to unlock the lockset 102, turn the interior handle 104, and open the door 108 after the door security device 110*b* has been activated.

In some implementations, the door security device 110*b* is held in its upper position through one or more forces exerted by the spring-loaded latch 106 of the lockset 102*d* on a portion of the door security device 110*b* that blocks the latch (e.g., a plate member of the door security device 110*b* that is described in more detail below with respect to FIGS. 2A-2E and 6A-6D) when the door security device 110*b* is placed in its upper position, through one or more friction forces between a portion of the door security device 110*b* that is directly mounted to the door 108*a* (e.g., one or more rail members of the door security device 110*b* that are described in more detail below with respect to FIGS. 2A-2E, 3A-3C, and 4A-4C) and a movable portion of the door security device 110*b* that contacts the portion of the door security device 110*b* that is directly mounted to the door 108*a* (e.g., a body member of the door security device 110*b* that is described in more detail below with respect to FIGS. 2A-2E and 5A-5D), or a combination thereof.

Additionally or alternatively, in some implementations, the door security device 110*b* is held in its upper position using a snap-fit. For example, the body member of the door security device 110*b* may have one or more tabs (e.g., flexible plastic tab, tensioned and flexible metal tab, spring-loaded tab, etc.) that contact a portion of the one or more rail members of the door security device and are in a compressed state when the door security device 110*b* is moved from its lower position to its upper position. When the door security device 110*b* reaches its upper position, the one or more tabs may enter one or more corresponding recesses formed in the one or more rail members such that the compression of the one or more tabs is reduced or eliminated.

In some implementations, the one or more tabs and one or more corresponding recesses may be configured such that the one or more tabs may be re-compressed when sufficient force is applied to the door security device 110*b* (e.g., sufficient downward force) so that the one or more tabs exit the one or more corresponding recesses. That is, in this example, the door security device 110*b* is not locked or permanently locked in its upper position such that the door security device 110*b* can still be activated (e.g., placed in its lower position) after the one or more tabs have entered the one or more corresponding recesses.

In some implementations, the one or more tabs are one or more detents and the one or more recesses are one more cavities that mate to the one or more detents. As an example, the one or more detents may include a spring-loaded ball or bump that mate to one or more corresponding semi-spherical shaped cavities. In more detail, the one or more detents and the one or corresponding cavities can include a ball catch.

As an example, no alerts or other audio are played through the speaker 120*a* in stage (D).

FIG. 1C is a diagram showing a fifth stage (E) and a sixth stage (F) for readying and using the security device 110.

In stage (E), the door security device 110*b* is activated to secure the door assembly 100*e*. As an example, in response to a lockdown alert output through the speaker 120*b*, a person (e.g., occupant of the room) closes the door 108*b* if not already closed and, after the door 108*b* is closed such that the door 108*b* is moved into the door frame 109 (e.g., door frame 109 encases the door 108*b*), moves the door security device 110*b* from an upper position to a lower position. In more detail, the person may pull down on an interactive member (e.g., knob) of the door security device 110*b* to move the door security device 110*b* from the upper position to the lower position, which hides the unsecure indicator 114 (e.g., red plate or sticker) and reveals the secure indicator 112 (e.g., green plate or sticker).

After the door security device 110*b* is primed (e.g., as shown in stage (E)), a person is not required to interact with the interior door handle 104*c* of the lockset 102*e* to activate the door security device 110*b* and secure the door assembly 100*e*.

In stage (F), the door assembly 100*f* is secured with the door security device 110*a* having been activated. The door security device 110*a* is in the lower position such that the secure indicator 112 (e.g., green plate or sticker) is displayed. With the door 108*b* closed and the door security device 110*a* in the lower position, the latch 106 of the locked lockset 102*f* is unblocked such that the latch 106 passes through the opening of the plate of the door security device 110*a* and enters an opening in the strike plate of the door frame 109, which secures the door 108*b* to the door frame 109 and, thereby, secures the door assembly 100*f*.

As an example, the speaker 120*b* outputs a lockdown alert which communicates to occupants that it is not safe to leave the room in stage (F). The display of the secure indicator 112 (e.g., green plate or sticker) communicates to the occupants the door assembly 100*f* is secure and that no occupants need to put themselves at risk by approaching the door 108*b*.

In some implementations, the door security device 110*b* is held in its lower position through gravity alone or gravity in combination with one or more friction forces.

In some implementations, the door security device 110*b* is held in its lower position through gravity and a snap-fit. The snap-fit may help to give a user, who is in the process of activating the door security device 110*b*, additional feedback that the door security device 110*b* has been successfully placed in its lower position. For example, the body member of the door security device 110*b* may have one or more tabs (e.g., flexible plastic tab, tensioned and flexible metal tab, spring-loaded tab, etc.) that contact a portion of the one or more rail members of the door security device and are in a compressed state when the door security device 110*b* is moved from its upper position to its lower position. When the door security device 110*b* reaches its lower position, the one or more tabs may enter one or more corresponding recesses formed in the one or more rail members such that the compression of the one or more tabs is reduced or eliminated.

In some implementations, the one or more tabs and one or more corresponding recesses may be configured such that the one or more tabs may be re-compressed when sufficient force is applied to the door security device 110*b* (e.g., sufficient upward force) so that the one or more tabs exit the one or more corresponding recesses. That is, in this example, the door security device 110*b* is not locked or permanently locked in its lower position such that the door security device 110*b* can be reset after the end of an emergency event.

In some implementations, the one or more tabs are one or more detents and the one or more recesses are one more cavities that mate to the one or more detents. As an example, the one or more detents may include a spring-loaded ball or bump that mate to one or more corresponding semi-spherical shaped cavities. In more detail, the one or more detents and the one or corresponding cavities can include a ball catch.

As will be discussed in more detail with respect to FIG. 8, in some implementations, the security lock device 110 may be an electronic device that is motorized and communicates with one or more external devices. As an example, the security lock device 110 may be motorized and communicate with a system for the building (e.g., the PA system) through a wired or wireless connection.

For example, the security lock device 110 may communicate with one or more computing devices over a wireless network for the building. Over the wireless network, the security lock device 110 can receive and process instructions. For example, the security lock device 110 may receive an instruction to move into a locked position and, in response, activate a motor to drive a belt assembly of the security lock device 110 to move the security lock device from an upper position, such as that shown in stage (E) of FIG. 1C as described above, to a lower position, such as that shown in stage (F) of FIG. 1C as described above.

As another example, the security lock device 110 may communicate with the speaker 120 over a wired or wireless connection, such as a Bluetooth connection or an NFC connection. In more detail, in response to the speaker receiving an instruction from the building's PA system to output a lockdown alert (e.g., as opposed to a fire alarm or some other type of alert or alarm that would communicate instructions for occupants to exit the building), the speaker 120 would transmit over the wired or wireless connection instructions to the security lock device 110 to move the security lock device from an upper position, such as that shown in stage (E) of FIG. 1C as described above, to a lower position, such as that shown in stage (F) of FIG. 1C as described above.

Figure 2B:
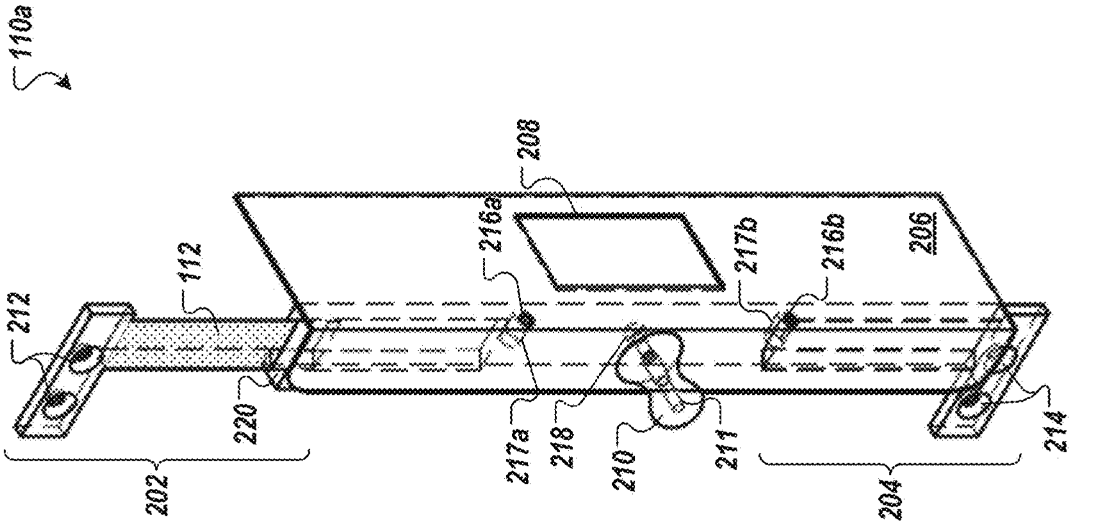
FIGS. 2A-2B are perspective views of an example door security device.
Figure 2A:
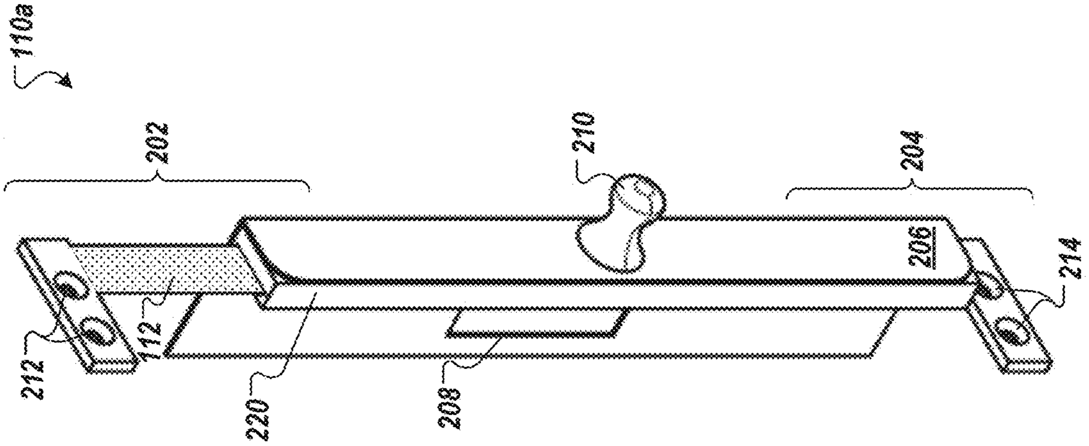

FIGS. 2A-2B are perspective views of the example door security device 110*a*. The door security device 110*a* includes a body member 220, a plate member 206 coupled to the body member 220, an upper rail member 202, and a lower rail member 204. Each of the rail members 202-204 includes an elongated portion and an end portion. For example, the upper rail member 202 includes an end portion with two openings 212 and the lower rail member 204 includes an end portion with two openings 214. The body member 220 of the door security device 110*a* is configured to receive the elongated portions of the rail members 202-204. The body member 220—and the plate member 206 through the body member 220—of the door security device 110*a* can move vertically up and down along the upper rail member 202 and the lower rail member 204. With the door security device 110*a* in the lower position, the body member 220 fully or substantially fully receives or the elongated portion of the lower rail member 204 and contacts (e.g., rests upon) a lower portion of the lower rail member 204.

To install the door security device 110*a*, each of the rail members 202-204 can be secured (e.g., mounted) to a door. For example, the rail members 202-204 may be mounted to the door 108 shown in FIGS. 1A-1C described above. In more detail, the upper rail member 202 may be mounted to the door 108 using two screws or bolts—the ends of which pass through the openings 212 and enter the door 108—and the lower rail member 204 may be mounted to the door 108 using two screws or bolts—the ends of which pass through the openings 214 and enter the door 108. The openings 212 may be conically-shaped, partially conically-shaped, or substantially conically-shaped such that the diameters of the openings at a back surface of the rail member 202 is smaller than the diameters of the openings at a front surface of the rail member 202 to catch the head of a fastener and prevent the fastener from passing completely through one of the openings 212 of the rail member 202. Similarly, the openings 214 may be conically-shaped, partially conically-shaped, or substantially conically-shaped such that the diameters of the openings at a back surface of the rail member 204 is smaller than the diameters of the openings at a front surface of the rail member 204 to catch the head of a fastener and prevent the fastener from passing completely through one of the openings 214 of the rail member 204.

In some implementations, the rail members 202-204 are mounted to a door using fasteners other than screws or bolts. For example, the rail members 202-204 may be mounted to a door using rivets or clips.

In some implementations, the rail members 202-204 are mounted to a door using a combination of different types of fasteners. For example, the rail members 202-204 may be mounted to a door using a combination of screws and clips.

In some implementations, the rail members 202-204 are mounted to a door without the user of fasteners. For example, the rail members 202-204 may be secured to the door through magnetic effects, adhesive, or a combination thereof. The rail members may not include any openings. For example, the upper rail member 202 may not include the openings 212 and the lower rail member 204 may not include the openings 214.

As an example, the rail members 202-204 may be mounted to a door using magnetic effects. For example, the rail members 202-204 may be made from a magnetized metal (e.g., magnetized cast steel) that attracts a door—or portion of a door—made from a ferromagnetic material (e.g., steel, certain types of stainless steel, etc.). As an example, the rail members 202-204 may be permanent magnets. As another example, the rail members 202-204 may be electromagnets powered by a battery onboard the door security device 110*a* or powered through a wired connection to an external power source.

As an example, the rail members 202-204 may be mounted to a door using an adhesive. For example, the rail members 202-204 may be made mounted to a door using an epoxy adhesive, a polyurethane adhesive, a polyimide adhesive, a silicone adhesive, an adhesive paste, a liquid adhesive, an adhesive film, adhesive pellets that are melted, hot melt adhesive, a reactive hot melt adhesive, a thermosetting adhesive, a pressure sensitive adhesive, a contact adhesive, a structure adhesive, a semi-structure adhesive, or a combination thereof. The adhesive may be applied to a backside of the rail members 202-204 and then the rail members 202-204 may be placed against an interior surface of a door such that the back side of the rail members 202-204 with the adhesive contacts the interior surface of the door.

In some implementations, the rail members 202-204 are mounted to a door using a combination of fasteners and magnetic effects. For example, the rail members 202-204 may produce a magnetic field and be mounted to a steel door using machine screws—the ends of which pass through the openings 212 and 214 respectively—and through magnetic effects that includes attraction between rail members 202-204 and the steel door.

In some implementations, the rail members 202-204 are mounted to a door using a combination of fasteners and adhesive. For example, the rail members 202-204 may be mounted to a wood door using wood screws—the ends of which pass through the openings 212 and 214 respectively—and adhesive applied to a backside of the rail members 202-204.

In some implementations, the elongated portions of the rail members 202-204 are shaped such that a front surface of the elongated portions is wider than a back surface of the elongated portions Such a shape would allow the body member 220 to catch or hook the elongated portions of the rail members 202-204 to secure the body member 220 to the door that the rail members 202-204 have been secured to.

For example, the elongated portions of the rail members 202-204 may be trapezoidal in shape. In more detail, the elongated portion of the rail member 202 may be trapezoidal in shape and able to enter a similarly shaped recess in an upper portion of the body member 220, and the elongated portion of the rail member 204 may be trapezoidal in shape and able to enter a similarly shaped recess in a lower portion of the body member 220. The trapezoidal shape of the elongated portions of the rail members 202-204 may help to keep the body member 220 and, thereby, the plate member 206, and the interactive member 210 secured to a door by, for example, allowing the body member 220 to catch or hook the elongated portions of the rail members 202-204.

As an example, installing the door security device 110*a* on a door may include performing the following steps in the following order: securing an lower rail member 204 to the door, positioning an entrance to a recess in a lower portion of the body member 220 near an end of the elongated portion of the rail member 204, lowering the body member 220 such that the end portion of the elongated portion of the rail member 204 enters the recess in the lower portion of the body member 220 (e.g., elongated portion of the rail member 204 fully enters the recess in the lower portion of the body member 220), positioning an end of the elongated portion of the rail member 202 near a recess in an upper portion of the body member 220, lowering the rail member 202 such that the end of the elongated portion of the rail member 202 enters the recess in the upper portion of the body member 220 (e.g., elongated portion of the rail member 202 partially enters the recess in the upper portion of the body member 220), and securing the rail member 202 to the door.

As an example, installing the door security device 110*a* on a door may include performing the following steps in the following order: securing an upper rail member 202 to the door, positioning an entrance to a recess in an upper portion of the body member 220 near an end of the elongated portion of the rail member 202, sliding the body member 220 upwards such that the end portion of the elongated portion of the rail member 202 enters the recess in the upper portion of the body member 220 (e.g., elongated portion of the rail member 202 fully enters the recess in the upper portion of the body member 220), positioning an end of the elongated portion of the rail member 204 near a recess in a lower portion of the body member 220, sliding the rail member 204 upwards such that the end of the elongated portion of the rail member 204 enters the recess in the lower portion of the body member 220 (e.g., elongated portion of the rail member 204 partially enters the recess in the lower portion of the body member 220), and securing the rail member 204 to the door.

The rail member 202 may include the secure indicator 112. The secure indicator 112 is displayed on at least a portion of the elongated portion of the rail member 202 such that the secure indicator 112 is visible when the door security device 110 is in its lower position (e.g., door security device 110*a*) and not visible or substantially not visible when the door security device 110 is in its upper position (e.g., door security device 110*b* as described above with respect to FIGS. 1B-1C). As an example, the secure indicator 112 is a plate, such as a piece of plastic that is mounted to the elongated portion of the rail member 202 and is colored and/or reflective. In more detail, the secure indicator 112 is a plate made from green plastic that is secured to the rail member 202 using adhesive and/or one or more fasteners, and forms part of the rail member 202.

As another example, the secure indicator 112 is paint (e.g., colored and/or reflective paint) that covers at least a portion of the elongated portion of the rail member 202. In more detail, the secure indicator 112 may be reflective, green paint that is painted on the elongated portion of the rail member 202. The elongated portion of the rail member 202 may have a slight recess or cavity to accept the paint and account for the thickness of the paint.

As another example, the secure indicator 112 is tape (e.g., colored and/or reflective tape) that covers at least a portion of the elongated portion of the rail member 202. In more detail, the secure indicator 112 may be reflective, green tape that is placed on the elongated portion of the rail member 202. The elongated portion of the rail member 202 may have a slight recess or cavity to accept the tape and account for the thickness of the tape.

The rail member 204 may include the unsecure indicator 114 as described above with respect to FIGS. 1A-1C and below with respect to FIGS. 4A-4C. The unsecure indicator 114 is displayed on at least a portion of the elongated portion of the rail member 204 such that the unsecure indicator 114 is visible when the door security device 110 is in its upper position e.g., door security device 110*b* as described above with respect to FIGS. 1B-1C) and not visible or substantially not visible when the door security device 110 is in its lower position (e.g., door security device 110*a*). As an example, the unsecure indicator 114 is a plate, such as a piece of plastic that is mounted to the elongated portion of the rail member 204 and is colored and/or reflective. In more detail, the unsecure indicator 114 is a plate made from red plastic that is secured to the rail member 204 using adhesive and/or one or more fasteners, and forms part of the rail member 204.

As another example, the unsecure indicator 114 is paint (e.g., colored and/or reflective paint) that covers at least a portion of the elongated portion of the rail member 204. In more detail, the unsecure indicator 114 may be reflective, red paint that is painted on the elongated portion of the rail member 204. The elongated portion of the rail member 204 may have a slight recess or cavity to accept the paint and account for the thickness of the paint.

As another example, the unsecure indicator 114 is tape (e.g., colored and/or reflective tape) that covers at least a portion of the elongated portion of the rail member 204. In more detail, the unsecure indicator 114 may be reflective, red tape that is placed on the elongated portion of the rail member 204. The elongated portion of the rail member 204 may have a slight recess or cavity to accept the tape and account for the thickness of the tape.

In some implementation, the body member 220 is made from a polymer. For example, the body member 220 is made from a plastic.

A person may interact with an interactive member 210 to move the body member 220 and the plate member 206 vertically up or down along the rail members 202-204. As an example, the interactive member 210 is a knob. As another example, the interactive member 210 is a handle. As another example, the interactive member 210 is a strap.

The interactive member 210 may be secured to the plate member 206 and/or the body member 220 using a fastener. For example, the interactive member 210 may be secured to the plate member 206 and the body member 220 using a fastener (e.g., screw, bolt, etc.), the end of which passes through a through-hole 218 in the body member 220, a through-hole in the plate member 206, and into a recess 211 of the interactive member 210. The fastener, thereby, couples the body member 220 to the plate member 206 and the interactive member 210 to the plate member 206. The body member 220 and the plate member 206 may be more securely coupled through one or more additional fasteners, such as (i) a fastener (e.g., rivet, screw, bolt, etc.) that enters the through-hole 216*a* of the plate member 206 and the recess 217*a* of the body member 220 and (ii) a fastener (e.g., rivet, screw, bolt, etc.) that enters the through-hole 216*b* of the plate member 206 and the recess 217*b* of the body member 220.

The through-hole 218 may include a larger first area configured to receive a head of a fastener such as a screw or bolt and a smaller second area configured to allow an end of the fastener to pass through the body member 220. The transition from the first area to the second area may be configured to catch the head of the fastener to prevent the head of the fastener from passing entirely through the body member 220.

The plate member 206 includes an opening 208. The opening 208 may be rectangular in shape. The opening 208 may be configured to permit one or more latches of a door lockset to (i) pass through the opening 208 when the door security device 110 is in the lower position (e.g., door security device 110*a*) and (ii) interact with a strike plate of a door frame (e.g., to enter one or more corresponding openings of a strike plate to secure the door in the door frame). The opening 208 may be positioned such that (i) one or more latches of a door lockset pass through the opening 208 when the door security device 110 is in the lower position (e.g., door security device 110*a*) and (ii) the one or more latches of a door lockset are blocked by a portion of the plate member 206 below the opening 208 when the door security device 110 is in the upper position (e.g., door security device 110*b* described above with respect to FIGS. 1B-1C).

In some implementations, the plate member 206 includes a notch instead of the opening 208. For example, the notch in the plate member 206 may have a sufficient thickness and length to permit one or more latches of a door lockset to (i) pass through the notch and by the plate member 206 when the door security device 110 is in the lower position (e.g., door security device 110*a*) and (ii) interact with a strike plate of a door frame (e.g., to enter one or more corresponding openings of a strike plate to secure the door in the door frame). The notch may be positioned such that (i) one or more latches of a door lockset pass through the notch and by the plate member 206 when the door security device 110 is in the lower position (e.g., door security device 110*a*) and (ii) the one or more latches of a door lockset are blocked by a portion of the plate member 206 below the notch when the door security device 110 is in the upper position (e.g., door security device 110*b* described above with respect to FIGS. 1B-1C).

In some implementations, different plate members may be swapped to customize the door security device 110. For example, a first plate member 206 having an opening 208 of a first size and shape may be used to accommodate a latch of a first door lockset, and a second plate member 206 having an opening 208 of a second size and shape may be used to accommodate a different latch of a second door lockset. In more detail, the latch of the first door lockset may be larger than the latch of the second door lockset. As another example, a first plate member 206 having a first thickness may be used to accommodate a first distance between a door and door frame, and a second plate member 206 having a second thickness may be used to accommodate a second distance between a door and door frame. In more detail, the first thickness and the first distance may be larger than the second thickness and the second distance.

In some implementations, the plate member 206 of the door security device 110*a* may be made from a metal. For example, the plate member 206 may be made from aluminum, steel such as stainless steel, magnesium, or the like.

In some implementations, the plate member 206 is magnetized. For example, the plate member 206 may be permanent magnet or may be magnetized with an electric current. With the plate member 206 magnetized, the plate member 206 may help to keep a door shut through the magnetic attraction between the plate member 206 and (i) a strike plate of a door frame for the door and/or (ii) a metal door frame. This is particularly helpful when the door security device 110 is placed in its upper position (e.g., the door security device 110*b* as described above with respect to FIGS. 1B-1C) as the latch of the door's lockset is unable to interact with the strike plate of the door frame when the door security device 110 is placed in this position.

The plate member 206 may be manufactured by cutting, from a flat sheet of metal, a first outline that corresponds to the outer edge of the plate member 206 and then a second outline that corresponds to the edge of the opening 208. One or more cutting techniques may be used, such as laser cutting, plasma cutting, water jet cutting, milling, etc. After cutting, the resulting sheet can be bent at approximately a 90° angle. After or as part of cutting, one or more holes may be drilled or otherwise formed, such as the through-hole 216*a*, the through-hole 216*b*, and the through-hole for attaching the interactive member 210.

In some implementations, the plate member 206 is bent at an angle other than a 90° angle. For example, the plate member 206 can be bent at a 91° angle, a 92° angle, a 93° angle, or another angle between 91° and 95°. With a bend greater than 90°, the plate member 206 can be configured with the rest of the door security device 110 and/or the door security device 110 can be mounted on a door at a particular position such that the plate member 206 acts as a shim to hold the door closed inside a door frame. In more detail, with a bend greater than 90°, an edge of the plate member 206 closest to and facing the exterior side of the door can easily enter the door frame and/or pass by a strike plate mounted to the door frame when the door is being closed. However, while the door continues to be closed the angle of plate member causes the plate member to contact the door frame and/or the strike plate and to exert greater force on the door frame and/or the strike plate the closer the door is moved to a closed position. In this way, the plate member 206 may act as a shim to hold the door in the door frame while a latch of a lockset is blocked by the plate member 206.

Additionally or alternatively, in some implementations, at least a portion of the plate member 206 may be manufactured or modified to provide a surface that provides significantly greater friction than another portion of the plate member 206. For example, the surface of the face of the plate member that includes the opening 208 may be coated with an abrasive or sticky coating (e.g., a polyurethane coating, a polyurea coating, a hybrid coating made from polyurethane and polyurea, etc.) that contacts a door frame and/or a strike plate mounted on the door frame when a door, that the door security device 110 is mounted to, is closed. This abrasive or sticky coating helps hold the door in the door frame without the assistance of a latch of a lockset that is blocked by the plate member 206 when the door security device 110 is placed in its upper position.

As another example, the surface of the face of the plate member that includes the opening 208 may manufactured or modified to provide an abrasive surface that would come into contact with a door frame and/or a strike plate mounted on the door frame when a door, that the door security device 110 is mounted to, is closed. This abrasive surface helps hold the door in the door frame without the assistance of a latch of a lockset that is blocked by the plate member 206 when the door security device 110 is placed in its upper position. In more detail, the surface may be etched to leave an abrasive surface (e.g., through cutting, material blasting, etc.). The resulting surface may have, for example, pyramid shaped structures, a lattice structure, volcano shaped structures, etc.

As another example, the surface of the face of the plate member that includes the opening 208 may manufactured or modified to provide an abrasive surface that would come into contact with a door frame and/or a strike plate mounted on the door frame when a door, that the door security device

110 is mounted to, is closed. This abrasive surface helps hold the door in the door frame without the assistance of a latch of a lockset that is blocked by the plate member 206 when the door security device 110 is placed in its upper position. In more detail, the surface may be etched to leave an abrasive surface (e.g., through cutting, material blasting, etc.). The resulting surface may have, for example, pyramid shaped structures, a lattice structure, volcano shaped structures, etc.

As another example, the surface of the face of the plate member that includes the opening 208 may be covered with a film or sheet that is secured to the plate member and would come into contact with a door frame and/or a strike plate mounted on the door frame when a door, that the door security device 110 is mounted to, is closed. The film or sheet may be a rubber film or sheet that provides a surface with a higher friction coefficient than the surface of the face of the plate member that includes the opening 208. The film or sheet may be secured to the plate member through an adhesive.

In some implementations, the techniques described above with respect to the plate member 206 may also be applied to a strike plate and/or a door frame that comes into contact with the plate member 206 when a door, that the door security device 110 is mounted to, is closed. For example, the strike plate may be coated with an abrasive or sticky coating to hold or help hold the door closed within the door frame after the door has been shut. As another example, one or more rubber pieces may be coupled to the door frame using an adhesive, where the one or more rubber pieces hold or help to hold the door closed within the door frame after the door has been shut.

In some implementations, the door that the door security device 110*a* and/or door frame for the door are modified to improve opening and closing of the door without the use of a door latch. As an example, one or more detents may be installed in the door and one or more corresponding cavities that mate to the one or more detents may be installed in the door frame. The one or more detents may be spring-loaded, backed by a compressible and rigid material (e.g., an elastomer), or the like. In more detail, the one or more detents and corresponding one or more cavities can include a ball catch with a spring-loaded ball.

As another example, one or more detents may be installed in the doorframe and one or more corresponding cavities that mate to the one or more detents may be installed in the door. The one or more detents may be spring-loaded, backed by a compressible and rigid material (e.g., an elastomer), or the like. In more detail, the one or more detents and corresponding one or more cavities can include a ball catch with a spring-loaded ball.

In some implementations, one or more magnetic inserts are embedded in the door security device 110 to hold the door in the door frame. As an example, one or more magnetic inserts may be integrated into a cast structure of a portion of the door security device 110 (e.g., the body member 220), to mimic the feel of a traditional latching door by enabling the door security device 110 to adhere magnetically to metal door frames. This magnetic interaction creates a sensation similar to a door securely latching, providing a more intuitive and reassuring user experience. This innovative approach replaces the conventional faux latch mechanism, simplifying the design while maintaining the sense of a secure, solid closure. This magnetic solution not only enhances the tactile feedback for users but also increases the durability of the device by eliminating the need for mechanical parts in the latching process.

In some implementations, the door security device 110*a* includes a single rail member. The body member 220 may be able to move vertically up and down along the single rail member. As an example, the single rail member may include a track which is configured to receive one or more corresponding pieces of the body member 220. The body member 220 may be secured to the single rail member when the track of the rail member receives the one or more corresponding pieces of the body member 220.

As another example, the body member 220 may be formed from two pieces, (i) a first piece that includes a recess configured to receive and contact an edge of the left side of an elongated, middle portion of the single rail member and (ii) a second piece that includes a recess configured to receive and contact an edge of the right side of the elongated, middle portion of the single rail member. In more detail, in installing the door security device 110*a*, the single rail member is first secured to the door using, for example, one or more fasteners. Then a right piece of the body member 220 may be fitted over the right side of the elongated, middle portion of the single rail member before a left piece of the body member 220 may be fitted over the right side of the elongated, middle portion of the single rail member. The right piece and the left piece may snap together during installation to form the body member 220. As another example, the right piece and the left piece may be secured to one another through one or more fasteners, through the plate member 206, using an adhesive, or a combination thereof.

As another example, a cart or sled may be coupled to the single rail member that is able to move vertically up and down along an elongated, middle portion of the single rail member. During installation of the door security device 110*a*, the body member 220 may be secured to the cart or sled with one or more fasteners (e.g., clips, screws, bolts, etc.), using an adhesive, or the like.

Figure 2E:
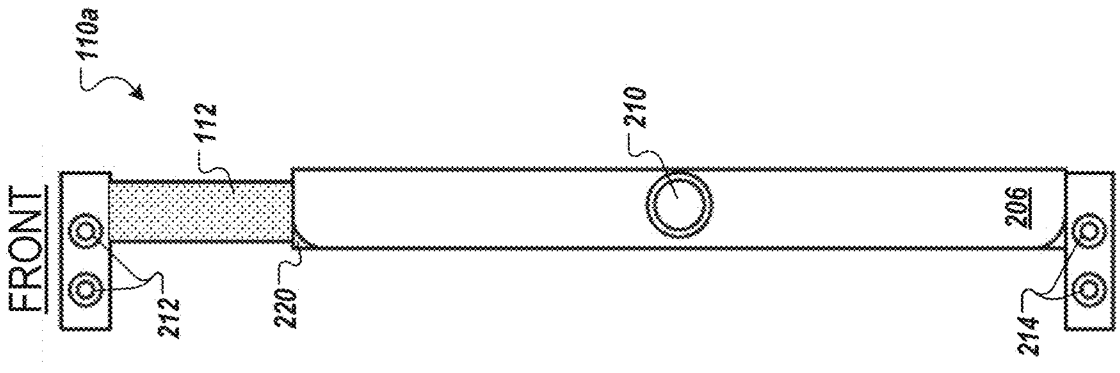
FIG. 2E is a front view of an example door security device.
Figure 2D:
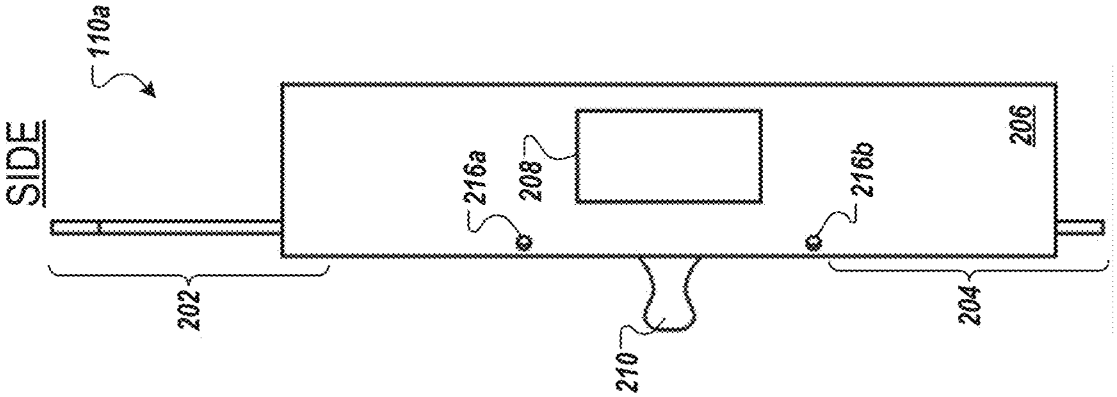
FIGS. 2C-2D are side views of an example door security device.
Figure 2C:
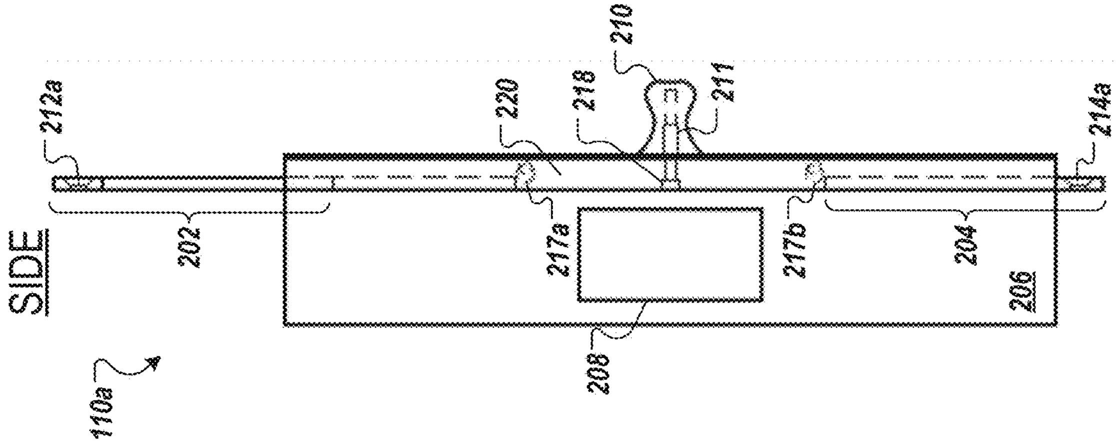

FIGS. 2C-2D are side views of the example door security device 110*a*.

FIG. 2C is a view of a first side of the door security device 110*a*. The door security device 110*a* includes the upper rail member 202 with a first opening 212*a*, the lower rail member 204 with a first opening 214*a*, the body member 220, the plate member 206 coupled to the body member 220, and the interactive member 210 with the recess 211. The body member 220 may include the recess 217*a*, the recess 217*b*, and the through-hole 218. The plate member 206 may include the opening 208.

FIG. 2D is a view of a second side of the door security device 110*a*. The door security device 110*a* includes the upper rail member 202, the lower rail member 204, the body member 220, the plate member 206 coupled to the body member 220, and the interactive member 210. The plate member 206 may include the through-hole 216*a* and the through-hole 216*b*.

FIG. 2E is a front view of the example door security device 110*a*. The door security device 110*a* includes the upper rail member 202 with the openings 212 and the indicator 112, the lower rail member 204 with the openings 214, the body member 220, the plate member 206 coupled to the body member 220, and the interactive member 210. The body member 220 may include the recess 217*a*, the recess 217*b*, and the through-hole 218. The plate member 206 may include the opening 208.

Figure 3A:
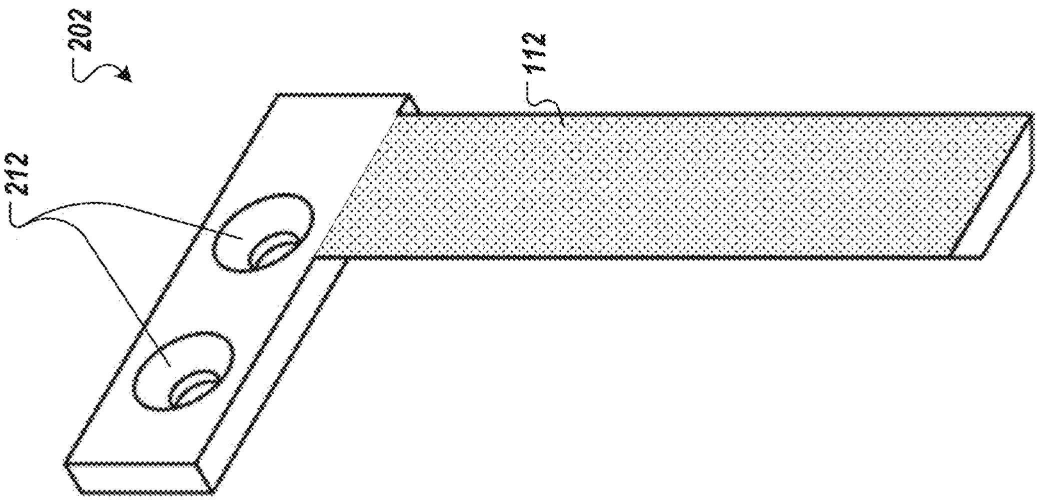
FIG. 3A is a perspective view of an example upper rail member of a door security device.

FIG. 3A is a perspective view of an example upper rail member 202 of a door security device. As an example, the rail member 202 includes the secure indicator 112 and the openings 212. In more detail, the elongated portion of the rail member 202 is trapezoidal in shape.

Figure 3B:
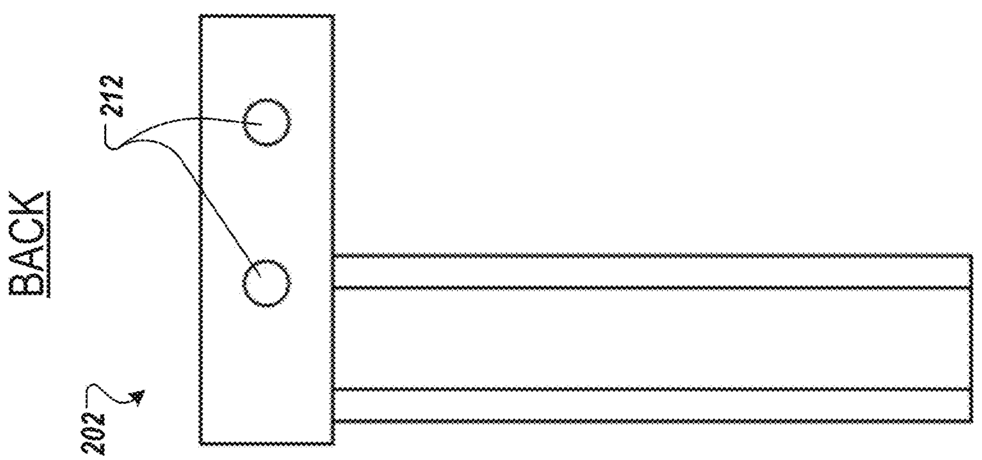
FIG. 3B is back view of an example upper rail member of a door security device.

FIG. 3B is back view of an example upper rail member 202 of a door security device. As an example, the rail member 202 includes the openings 212. In more detail, the elongated portion of the rail member 202 is trapezoidal in shape.

Figure 3C:
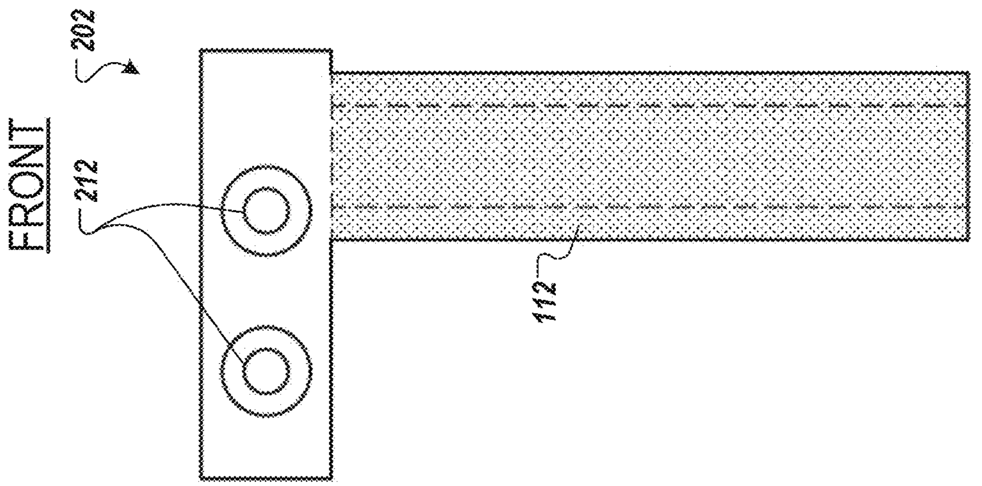
FIG. 3C is a front view of an example upper rail member of a door security device.

FIG. 3C is a front view of an example upper rail member 202 of a door security device. As an example, the rail member 202 includes the secure indicator 112 and the openings 212. In more detail, the elongated portion of the rail member 202 is trapezoidal in shape.

Figure 4A:
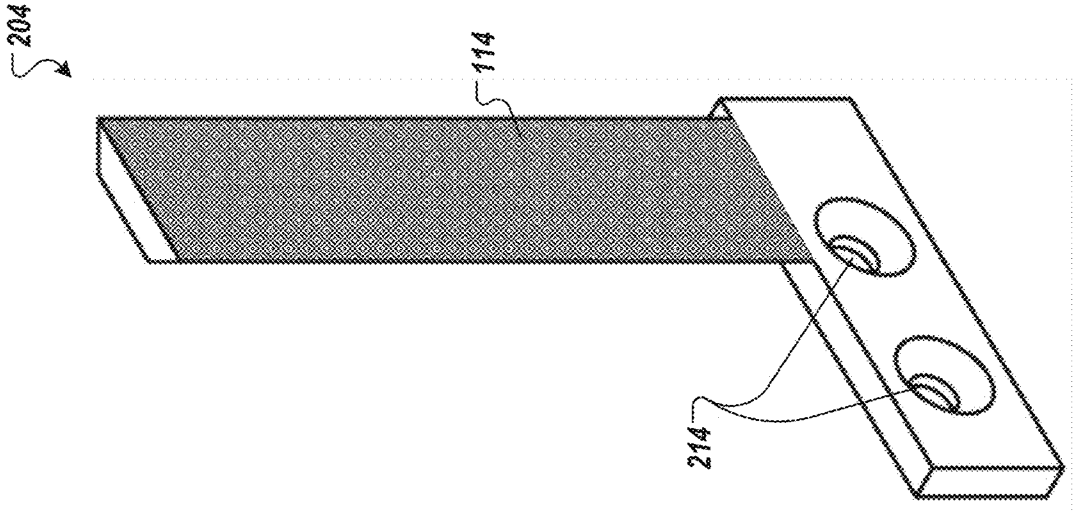
FIG. 4A is a perspective view of an example lower rail member of a door security device.

FIG. 4A is a perspective view of an example lower rail member 204 of a door security device. As an example, the rail member 204 includes the unsecure indicator 114 and the openings 214. In more detail, the elongated portion of the rail member 204 is trapezoidal in shape.

Figure 4B:
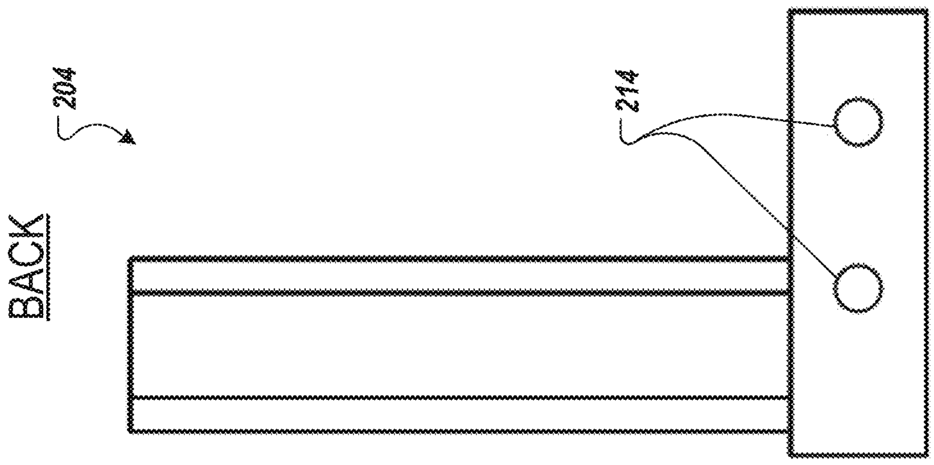
FIG. 4B is back view of an example lower rail member of a door security device.

FIG. 4B is back view of an example lower rail member 204 of a door security device. As an example, the rail member 204 includes the openings 214. In more detail, the elongated portion of the rail member 204 is trapezoidal in shape.

Figure 4C:
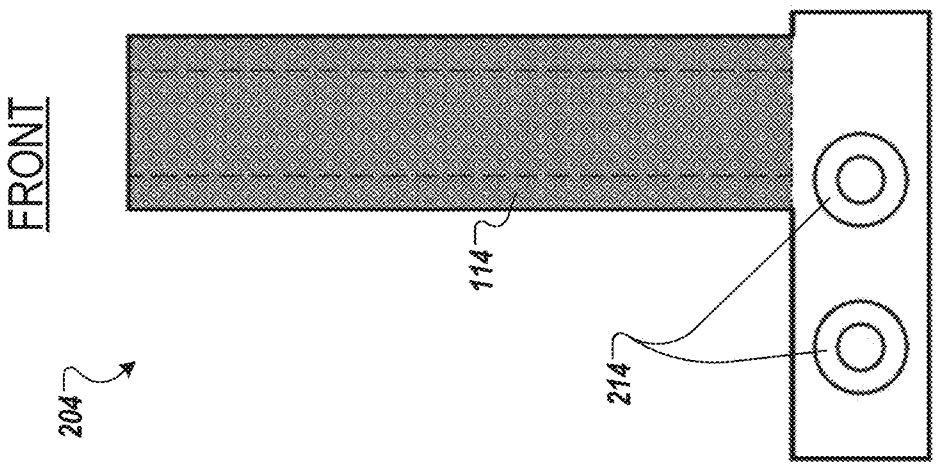
FIG. 4C is a front view of an example lower rail member of a door security device.

FIG. 4C is a front view of an example lower rail member 204 of a door security device. As an example, the rail member 204 includes the unsecure indicator 114 and the openings 214. In more detail, the elongated portion of the rail member 204 is trapezoidal in shape.

Figure 5D:
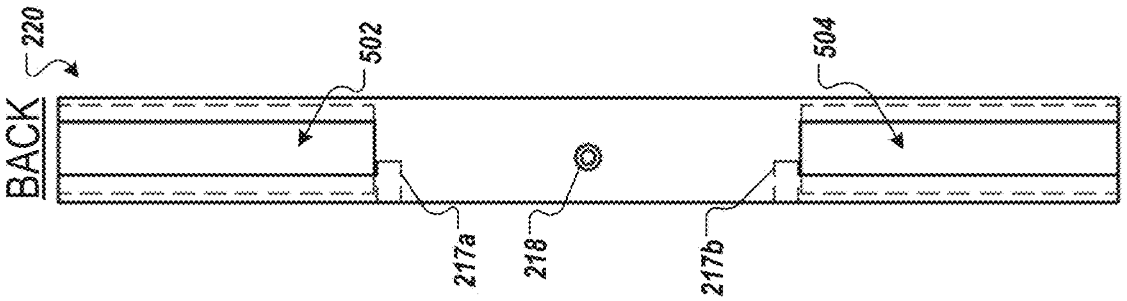
FIG. 5D is a back view of an example body member of a door security device.
Figure 5C:
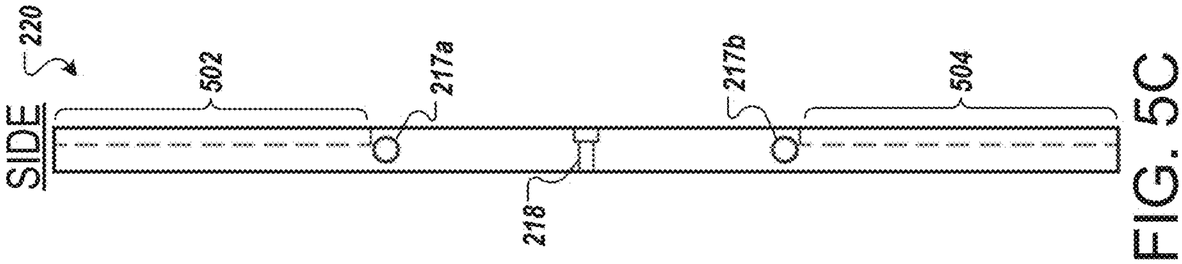
FIG. 5C is a side view of an example body member of a door security device.
Figure 5B:
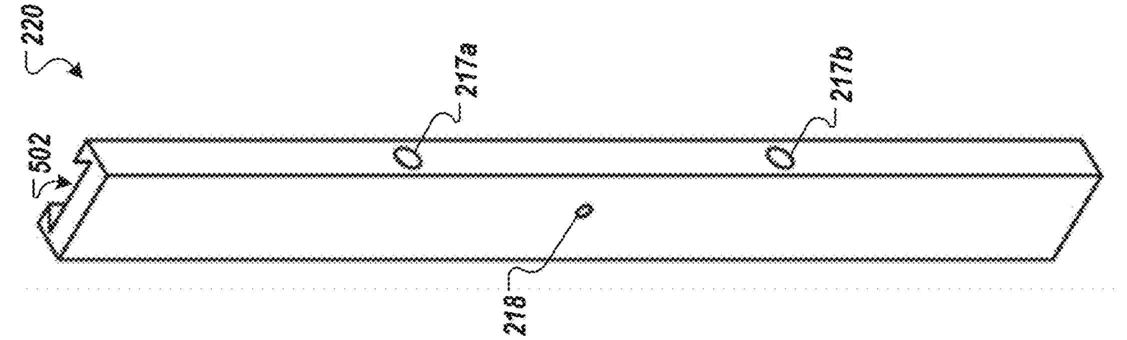
FIGS. 5A-5B are perspective views of an example body member of a door security device.
Figure 5A:
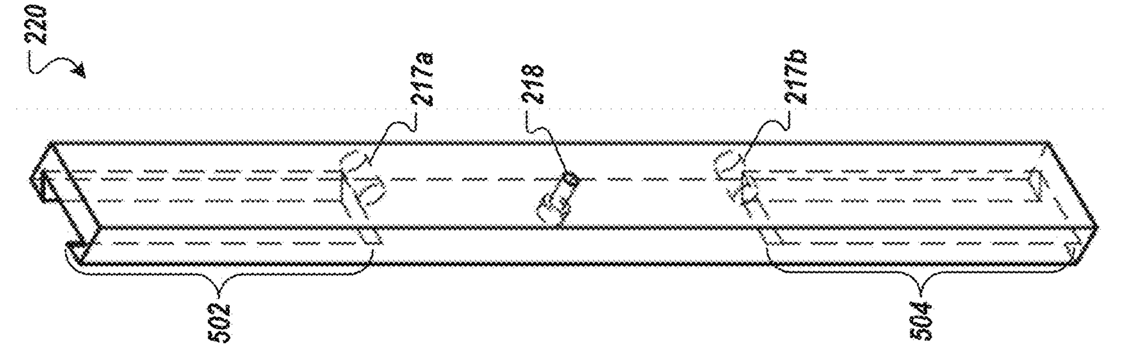

FIGS. 5A-5B are perspective views of the example body member 220 of a door security device. The body member 220 includes a first recess 502 formed in an upper portion of the body member 220 configured to receive an elongated portion of the rail member 202 described in more detail above with respect to FIGS. 2A-2E and FIGS. 4A-4C. The body member 220 includes a second recess 504 formed in a lower portion of the body member 220 configured to receive an elongated portion of the rail member 204 described in more detail above with respect to FIGS. 2A-2E and FIGS. 4A-4C. The body member 220 may also include the recess 217*a*, the recess 217*b*, and the through-hole 218 described in more detail above with respect to FIGS. 2A-2E.

FIG. 5C is a side view of the example body member 220 of a door security device. The body member 220 includes the first recess 502 formed in an upper portion of the body member 220 configured to receive an elongated portion of the rail member 202 described in more detail above with respect to FIGS. 2A-2E and FIGS. 4A-4C. The body member 220 includes the second recess 504 formed in a lower portion of the body member 220 configured to receive an elongated portion of the rail member 204 described in more detail above with respect to FIGS. 2A-2E and FIGS. 4A-4C. The body member 220 may also include the recess 217*a*, the recess 217*b*, and the through-hole 218 described in more detail above with respect to FIGS. 2A-2E.

FIG. 5D is a back view of the example body member 220 of a door security device. The body member 220 includes the first recess 502 formed in an upper portion of the body member 220 configured to receive an elongated portion of the rail member 202 described in more detail above with respect to FIGS. 2A-2E and FIGS. 4A-4C. The body member 220 includes the second recess 504 formed in a lower portion of the body member 220 configured to receive an elongated portion of the rail member 204 described in more detail above with respect to FIGS. 2A-2E and FIGS. 4A-4C. The body member 220 may also include the recess 217*a*, the recess 217*b*, and the through-hole 218 described in more detail above with respect to FIGS. 2A-2E.

Figure 6A:
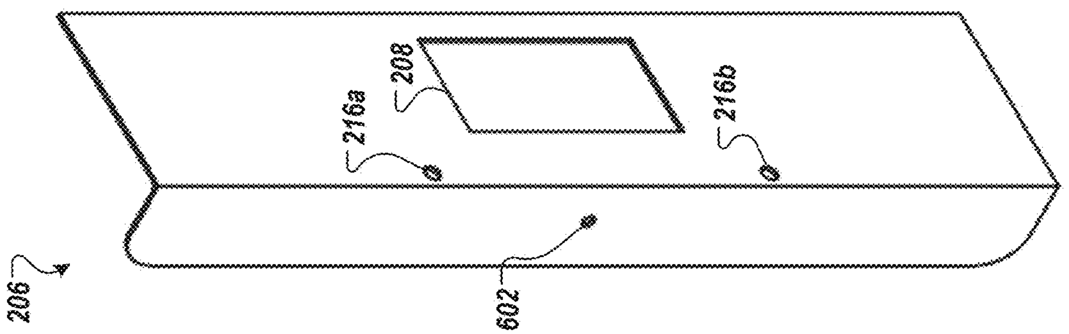
FIGS. 6A-6B are perspective views of an example plate member of a door security device.
Figure 6B:
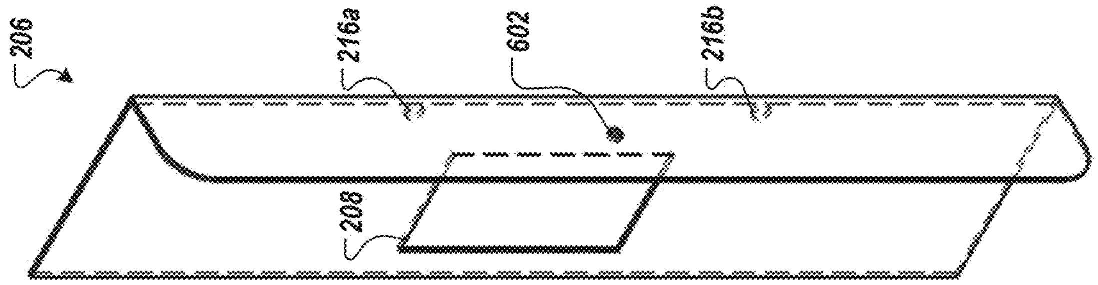

FIGS. 6A-6B are perspective views of the example plate member 206 of a door security device. The plate member 206 includes the opening 208, the through-hole 216*a*, and the through-hole 216*b* described in more detail above with respect to FIGS. 2A-2E. The plate member 206 includes a through-hole 602. As an example, a fastener may pass through the through-hole 602 to secure an interactive member of the door security device to the plate member 206.

Figure 6C:
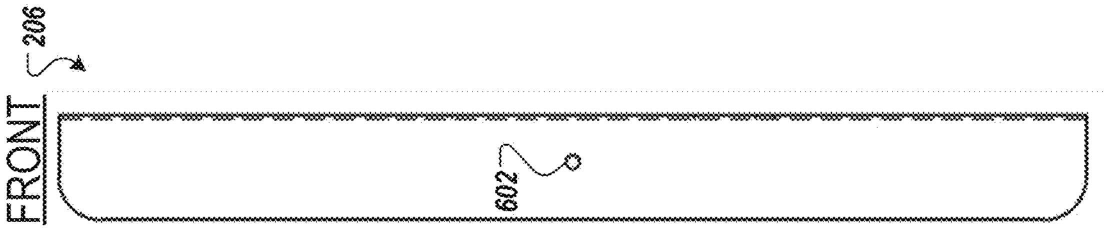
FIG. 6C is a front view of an example plate member of a door security device.

FIG. 6C is a front view of the example plate member 206 of a door security device. The plate member 206 includes the through-hole 602. As an example, a fastener may pass through the through-hole 602 to secure an interactive member of the door security device to the plate member 206.

Figure 6D:
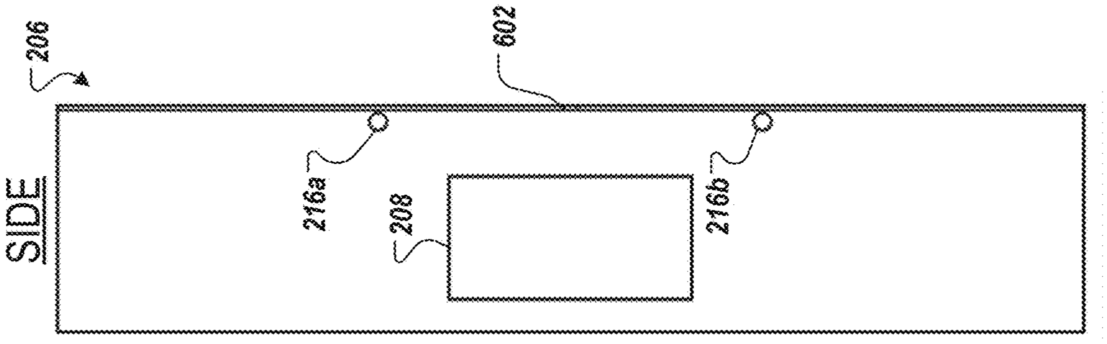
FIG. 6D is a side view of an example plate member of a door security device.

FIG. 6D is a side view of the example plate member 206 of a door security device. The plate member 206 includes the opening 208, the through-hole 216*a*, and the through-hole 216*b* described in more detail above with respect to FIGS. 2A-2E. The plate member 206 includes the through-hole 602. As an example, a fastener may pass through the through-hole 602 to secure an interactive member of the door security device to the plate member 206.

Figure 7C:
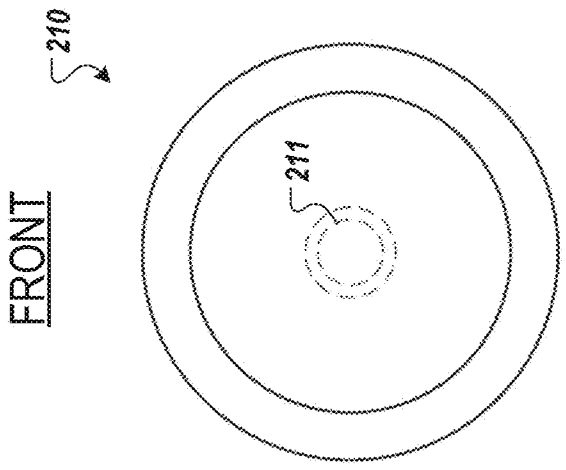
FIG. 7C is a front view of an example interactive member of a door security device.
Figure 7B:
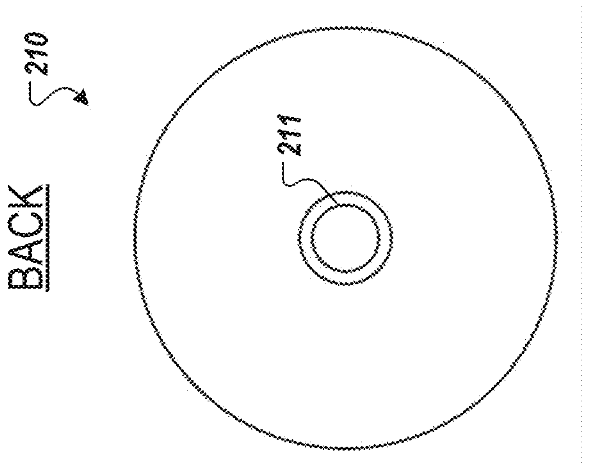
FIG. 7B is a back view of an example interactive member of a door security device.
Figure 7A:
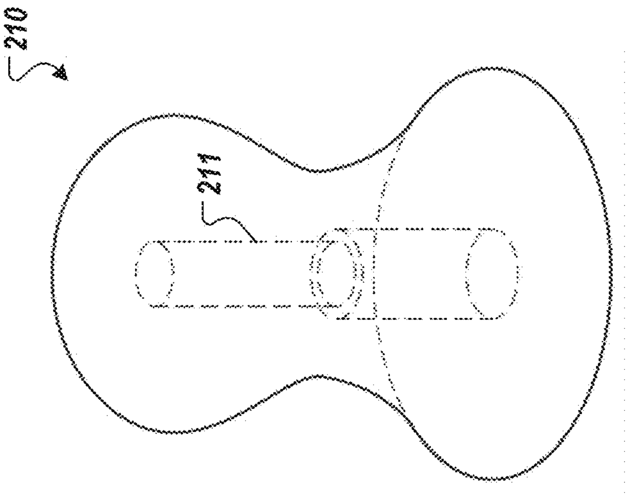
FIG. 7A is a perspective view of an example interactive member of a door security device.

FIG. 7A is a perspective view of the example interactive member 210 of a door security device. The interactive member 210 includes the recess 211. As an example, the recess 211 may receive an end of a fastener (e.g., screw, bolt, rivet, etc.).

In some implementations, the end of a fastener that enters the recess 211 is secured to the interactive member 210 using adhesive. For example, the recess 211 may be filled with adhesive prior to the end of the fastener entering the recess 211.

In some implementations, the recess includes a first section and a second section that is narrower than the first section. As an example, the first section may be configured to receive an end of a screw. The screw may then by secured to the interactive member 210 by turning the screw which causes the screw to enter the second, narrower section of the recess 211 and creates corresponding threads in the second section, securing the screw to the interactive member 210.

In some implementations, the recess 211 receives an insert that is configured to accept an end of a fastener. For example, an insert with a thread type for a particular screw may be inserted into the recess 211 and secured to the interactive member 210 with adhesive placed within the recess 211 and/or on an outer surface of the insert.

FIG. 7B is a back view of the example interactive member 210 of a door security device. The interactive member 210 includes the recess 211. As an example, the recess 211 may receive an end of a fastener (e.g., screw, bolt, rivet, etc.).

FIG. 7C is a front view of the example interactive member 210 of a door security device. The interactive member 210 includes the recess 211. As an example, the recess 211 may receive an end of a fastener (e.g., screw, bolt, rivet, etc.).

In some implementations, the door security device 110 includes additional components. For example, the door security device 110 may also include one or more door shims. For example, installing the door security device 110 may also include installing one or more door shims that provide friction between a door and/or the door security device 110 and a door frame when the door security device 110 is an upper, unsecured position. The friction that the door shims provide may help to prevent the door from swinging open after it is closed since the door latch is not able to do so, having been blocked by the door security device 110.

In some implementations, different sized door shims are used for different door assemblies. For example, a first, thinner door shim may be selected over a second, thicker door shim when installing the door security device 110 when the gap between a door and a door frame of a door assembly is less than a particular length.

In some implementations, two or more door shims can be stacked on top of one another to provide better fit and/or provide greater control over the desired amount of friction.

In some implementations, the shims are or otherwise include magnetic material. The shims, in this case, may be installed along with the door security device 110 by simply placing them against the side of a metal door and/or along an inside surface of a door frame.

In some implementations, the shims are secured to a door and/or door frame using one or more fasteners. For example, a shim may be secured to a door and/or door frame using two screws.

In some implementations, the shims are secured to a door and/or door frame using an adhesive. For example, a shim may be secured to a door and/or a door frame using a silicone sealant.

Figure 8:
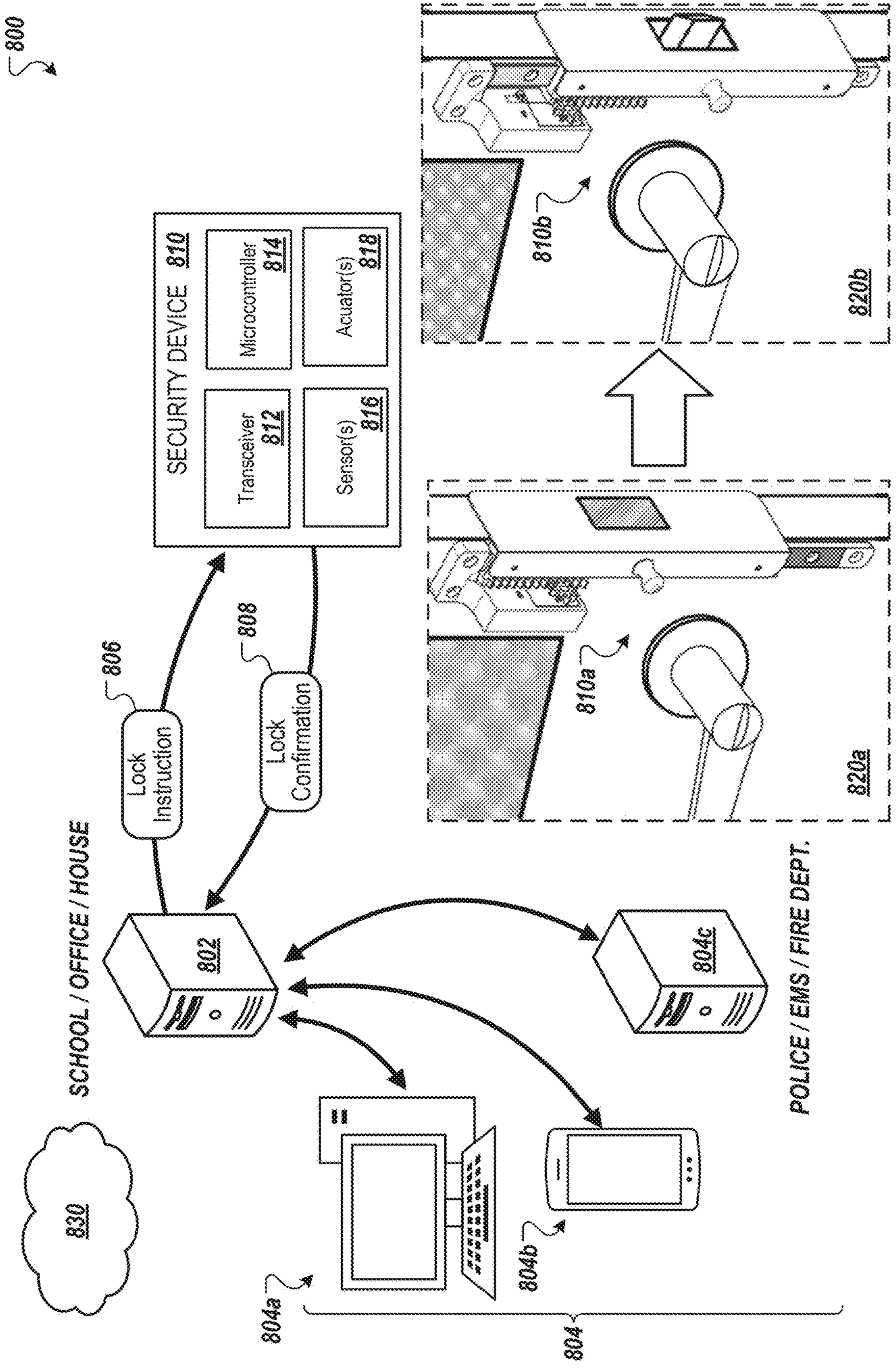
FIG. 8 is an example system that includes a motorized door security device.

FIG. 8 is an example system 800 that includes a motorized door security device 810. The system 800 includes a computing system 802 and a door security device 810 that communicates with the computing system 802. The door security device 810 may be installed on a door of a building. The computing system 802 may communicate with one or more computing devices 804, such as a computer 804*a*, a mobile computing device 804*b*, and/or an external server 804*c* over a network 830.

In some implementations, the door security device 810 is the door security device 900 described below with respect to FIGS. 9A-9E.

In some implementations, the system 800 is or includes a public address (PA) system for one or more buildings. For example, the computing system 802 may be PA system for a building in which the door security device 810 is located. In more detail, the computing system 802 may be PA system for a school that includes multiple classrooms where a door security device 810 is installed on at least one door of each of the classrooms. The computing system 802 may communicate with each door security device 810 installed in the school.

The network 830 may include wired and/or wireless connections. The network 830 may include one or more local networks. For example, the network 830 may be a local network established for a school. The network 830 may include one or more wide-area networks. For example, the network 830 may be the Internet. The network 830 may include a cellular network. For example, the network 830 may be a 5G or 4G LTE network.

The computing system 802 may include one or more computing devices. As an example, the computing system 802 may be or include a server system. The computing system 802 may be an on-premises computing system. For example, the computing system 802 may be a server system located on the premises of a school. The computing system 802 may be a cloud-computing system. For example, the computing system 802 may be provided through one or more cloud computing service providers (e.g., Amazon AWS, Microsoft Azure, etc.).

The computing system 802 may communicate with the security device 810 over the network 830. For example, the computing system 802 may communicate with security device 810 wirelessly over the network 830.

The computing system 802 may communicate with the security device 810 over a network other than the network 830. For example, the computing system 802 may communicate with the security device 810 over a private and/or secure network. In more detail, the network over which the computing system 802 communicates with the security device 810 is an encrypted network. As another example, security device 810 and the computing system 802 may communicate over a Bluetooth network, an NFC network, or the like. In more detail, the security device 810 may communicate with computing system 802 over a node network where the security device 810 communicates with a particular node through a Bluetooth network, an NFC network, or the like. The computing system 802 may store a status of each door in the building (or set of buildings) that the door security device 810 is installed on. The status information for each door may be continually or continuously updated as status information is requested and/or received (e.g., as part of a feedback loop).

The computer 804*a* may be an on-premises computer. For example, the computer 804*a* may a computer located in the same building as where the security device 810 is installed and accessible to persons with certain security permissions. In more detail, the desktop computer 804*a* may a computer located by a classroom and accessible by one or more teachers who teach in that classroom. As will be discussed in more detail below, a user of the desktop computer 804*a* may be able to notify the computing system 802 of an emergency event such as a lockdown event (e.g., potential shooter).

As an example, the computer 804*a* is a desktop computer. As another example, the computer 804*a* is a laptop computer.

The mobile device 804*b* may a mobile device of person having certain security permissions. For example, the mobile device 804*b* may be a mobile device of an employee of a school. The mobile device 804*b* may run a particular application for the school that, for example, permits a user of the mobile device 804*b* to the computing system 802 of an emergency event such as a lockdown event (e.g., potential shooter).

As an example, the mobile device 804*b* is one of the following: a cell phone, a smart phone, a tablet computing device, a PDA, or the like.

The external server 804*c* may be a server system or computing system that is remote with respect to the computing system 802 or with respect to the building in which the security device 810 is located. The external server 804*c* may be able to notify the computing system 802 of an emergency event such as a lockdown event (e.g., potential shooter), for example, in response to a notification of the same provided through a client device of the external server 804*c*.

The external server 804*c* may be a computing system for one or more of a police department, an emergency medical services (EMS) provider, or a fire department.

The door security device 810 includes a transceiver 812 that enables the security device 810 to wirelessly receive and transmit information, a microcontroller 814 that enables the security device 810 to process information into instructions for one or more actuators 818, the one or more actuators 818 to move the security device 810 from an upper position (e.g., the security device 810*a*) as shown in the view of a door's lockset 820*a* to a lower position (e.g., the security device 810*b*) as shown in the view of the door's lockset 820*b*, and one or more sensors 816 to indicate when the security device 810 has reached the lower position. The microcontroller 814 may be electrically coupled to the transceiver 812, the one or more actuators 818, and the one or more sensors 816.

In some implementations, the microcontroller 814 is, includes, and/or is replaced with a microprocessor. The door security device 810 may include a memory that is electronically coupled to the microprocessor, such as a RAM or hard drive.

In some implementations, communication between the computing system 802 and the door security device 810 is facilitated through the use of the MQTT Server protocol. This protocol ensures a secure and exclusive connection, allowing only pre-approved devices to publish or receive information on a designated channel. This choice is not only a measure of security but also serves to optimize system performance and balance the load, ensuring that all data is accurately processed and stored. The architecture of the system 800 is described in more detail below with respect to FIGS. 12-13.

As an example, the microcontroller 814 establishes a connection with the computing system 802 of the building, enabling a streamlined and centralized management of security protocols.

In some implementations, a feedback loop is established between the computing system 802 and the door security device 810. For example, the microcontroller 814 of the door security device 810 may establish a continuous feedback loop with the computing system 802 to ensure that the status (e.g., secured or unsecured) of the doors security device 810 is consistently relayed back to the central control point. This real-time status update may be made accessible via a secure HTML interface or through other API formats over the network 830, providing users of the computing devices 804 (e.g., first responders, police, system administrators, etc.) with immediate and accurate information regarding the lock status of each door equipped with a door security device 810.

The one or more actuators 818 may include, for example, one or more of the following: a stepper motor, a servo motor, a DC motor, a linear actuator (e.g., rack and pinion), or a combination thereof. In more detail, the one or more actuators 818 may include a rack and pinion linear actuator (e.g., the rack 938 and pinion 936 shown in FIGS. 9A-9E and described in more detail below) and a motor that drives the pinion (e.g., the motor 940 shown in FIG. 9C and described in more detail below). For example, the one or more actuators 818 may include a motor (e.g., DC motor, servo motor, stepper motor, etc.) having a shaft that is torsionally coupled to a pinion of a rack and pinion linear actuator. The pinion may engage with the rack that is, for example, secured to a body member of the door security device 810. The shaft of the motor may be torisionally coupled to the pinion through one or more mechanical connections, such as the end of the motor's shaft have a particular shape that enters a corresponding slot or recess located at the center or substantially at the center of the pinion. The shaft of the motor may be torsionally coupled to the pinion through a metal or plastic adapter. The shaft of the motor may be torsionally coupled to the pinion through an adhesive.

In some implementations where the one or more actuators 818 include a rack and pinion linear actuator, the rack replaces both the upper and lower rail members shown in some implementations as described above. For example, the rack may replace the rail members 202 and 204 of the door security device 110 as described above with respect to FIGS. 2A-2E, 3A-3C, and 4A-4C; and/or the rack may replace the rail members 902 and 904 of the door security device 900 as described below with respect to FIGS. 9A-9E and FIGS. 10A-10D.

In some implementations where the one or more actuators 818 include a rack and pinion linear actuator, the rack replaces either the upper rail member or the lower rail member of the door security device. For example, the rack may replace the upper rail member 202 or the lower rail member 204 of the door security device 110 as described above with respect to FIGS. 2A-2E, 3A-3C, and 4A-4C; and/or the rack may replace the upper rail member 902 or the lower rail member 904 of the door security device 900 as described below with respect to FIGS. 9A-9E and FIGS. 10A-10D.

In some implementations where the one or more actuators 818 include a rack and pinion linear actuator, the rack does not replace any rail members. For example, the rack may not replace any of the rail members 202 and 204 of the door security device 110 as described above with respect to FIGS. 2A-2E, 3A-3C, and 4A-4C; and/or the rack may not replace any of the rail members 902 and 904 of the door security device 900 as described above with respect to FIGS. 9A-9E and FIGS. 10A-10D. Instead, the rack may be secured to the side of the body of the door security device. Alternatively, the rack may be secured to the back of the body of the door security device and, for example, positioned between the upper and lower rail members. The elongated portions of the upper and lower rail members may additionally or alternatively be shortened to make room for the rack positioned between the upper and lower rail members in this example.

In some implementations, the security device 810 includes a drive that is part of and/or is mechanically coupled to the one or more actuators 818. As an example, the security device 810 may include a rack and pinion where the pinion is driven by an electrical motor. As an example, the security device 810 may include a belt drive that is mechanically connected (e.g., rotatably connected) to a motor to move the security device 810 to its lower, secure position (e.g., such that a body member, a plate member, and an interactive member of the security device 810 are moved to their lowest position). As another example, the security device 810 may include a gear drive (e.g., other than a rack and pinion linear actuator) that is mechanically connected (e.g., rotatably connected) to a motor to move the security device 810 to its lower, secure position (e.g., such that a body member, a plate member, and an interactive member of the security device 810 are moved to their lowest position). In more detail, the gear drive may include one or more gear racks (e.g., installed on or between rail members of the door security device 810, formed from portions of elongated members of the rail members of the door security device 810, etc.). A gear driven by the one or more actuators 818 may be connected to a body member of the door security device 810 and move the door security device 810 downward to its lower position.

In some implementations, the one or more actuators 818 are configured to release a locking mechanism to drop part of the door security device 810 to place the door security device 810 in its lower, secure position. As an example, the one or more actuators 818 may include a linear actuator configured to release a clip to drop a body member, a plate member, and an interactive member of the door security device 810 to place the door security device 810 in its lower, secure position. The movement of the door security device 810 from its upper, unsecure position to its lower, secure position may be aided through, for example, one or more elastic bands or springs that pull the body member, the plate member, and/or the interactive member of the door security device 810 downward.

As an example, the one or more sensors 816 may indicate when the door security device 810 has been successfully placed in its secured, lower position. The one or more sensors 816 may include one or more of the following: a light sensor, a contact sensor, a position sensor, a switch, or the like. The one or more sensors 816 can additionally or alternatively include other types of sensors, such as microphones. Microphones may be useful to pinpoint events within the buildings, such as emergencies (e.g., based on a sound profile corresponding to a gun shot, based on a sound profile corresponding to screaming or yelling, etc.).

As an example, the one or more sensors 816 can include a limit switch (e.g., the limit switch 934 shown in FIGS. 9A and 9D-9E below) or end stop switch that transmits an electrical signal to the microcontroller 814 based on a physical interaction between the limit switch and another portion of the door security device 810. In more detail, the limit switch may send an electrical signal in response to being released when the door security device 810 is moved from its upper position (e.g., door security device 810*a*) to its lower position (e.g., door security device 810*b*), indicating that the door security device 810 has reached its lower position and/or is about to reach its lower position.

Continuing the example, activation of the limit switch may signal the computing system 802 (e.g., the lock confirmation 808), prompting an update of the door's status on the computing system 802.

For example, in response to receiving an electrical signal from a limit switch, the microcontroller 814 may stop driving a motor of the actuator(s) 818. As another example, in response to receiving an electrical signal from a limit switch, the microcontroller 814 continues to drive a motor of the actuator(s) 818 for a specific amount of time before the microcontroller 814 stops driving the motor. As another example, in response to receiving an electrical signal from a limit switch, the microcontroller 814 continue to drive a stepper motor of the actuator(s) 818 for a specific number of steps before the microcontroller 814 stops driving the stepper motor.

In some implementations, the one or more sensors 816 are part of the one or more actuators 818 and/or directly monitor the one or more actuators 818. For example, the one or more sensors 816 may include a motor rotation sensor to measure how many rotations a motor of the one or more actuators 818 have turned. In turn, this measurement can be used to determine the position of the door security device 810, such as whether it is in its upper position, its lower position, or a position between its upper and lower position.

In some implementations, the door security device 810 does not include the sensor(s) 816. For example, the door security device 810 may track its position using a timer and the time that a motor is driven for and/or tracking the steps that a stepper motor is turned.

In some implementations, the door security device 810 includes a memory to store information. The memory may be part of the microcontroller 814 or may be a separate element of the door security device that is electronically coupled to the microcontroller 814, such as through a bus (e.g., data bus). The memory may include one or more of ROM, RAM, SRAM, DRAM, storage (e.g., hard drive), or the like.

As an example, the door security device 810 may store a current status of the door security device 810 that identifies whether the door security device 810 is in its upper, unsecured position or lower, secured position. The microcontroller 814 may update the stored state of the door security device 810 in response to one or more signals received from the sensor(s) 816. For example, a limit switch (e.g., the limit switch 934 shown in FIGS. 9A and 9D-9E below) may produce an electrical signal in response to each interaction, including an interaction when the limit switch is released when the door security device 810 is moved from its upper position to its lower position and an interaction when the limit switch is compressed when the door security device 810 is moved from its upper position to its lower position. In response to each electrical signal received from the limit switch, the microcontroller 814 may switch the current state of the door security device 810 stored in memory from its previous state. In more detail, the memory of the door security device 810 may store a "0" in memory for the state of the door security device 810 as default to indicate that the door security device is initially placed in its lower position during installation, update the stored value to "1" in response to receiving a first electrical signal from the limit switch when the door security device 810 is primed and placed in its upper position, and update the stored value to "0" in response to receiving a second electrical signal from the limit switch when the door security device 810 is locked and placed in its lower position. The microcontroller 814 may obtain the state value from memory and provide (i) the value or (ii) an indication of the position of the door security device 810 that the value represents to the computing system 802, such as in response to a request received from the computing system 802 for the current position of the door security device 810.

Various other values may be stored in a memory of the door security device 810. For example, one or more instructions received from the computing system 802 may be stored, at least temporarily, in a memory of the door security device 810. The memory may also store values indicating how long or how many steps that the microcontroller 814 should drive a motor of the actuators 818, e.g., in response to the lock instruction 806 and/or an electrical signal from the one or more sensors 816.

For example, the memory may store a first value of "5" referenced by the microcontroller 814 in response to receiving the lock instruction 806 where the value indicates that the motor should be driven for five seconds to move the door security device 810 from its upper position to its lower position. The memory may also store a second value of "1.5" referenced by the microcontroller 814 in response to receiving an electronic signal from a limit switch of the door security device 810 providing that the motor should now be driven for 1.5 seconds-regardless of how much time is left from the original timer—to finish placing the door security device 810 in its lower position. Larger differences (e.g., difference greater than 10%, difference greater than 15%, difference greater than 20%, etc.) between the remaining time of the original timer and the second value looked up may be noted by the microprocessor as an error and an indication of the error may be stored in memory. This error may indicate, for example, a failing motor. In response to determining that an error occurred, the microcontroller 814 may generated and transmit a notification using the transceiver 812 to the computing system 802. The notification may include an indication of the error that occurred. Alternatively, the difference in value may be used for calibration. For example, the microcontroller 814 and/or the computing system 802 may use the difference in value to update the first value stored and referenced by the microcontroller 814 to move the door security device 810 from its upper position to its lower position.

As another example, the memory may store lookup tables and/or values for formulas that the microcontroller 814 uses to lookup or calculated variable values. For example, after looking up the first value of "5" in response to receiving the lock instruction 806 where the value indicates that the motor should be driven for five seconds to move the door security device 810 from its upper position to its lower position, the microcontroller 814 may store in memory a value of the time remaining when it receives the electrical signal from the limit switch. This stored value may then be used by the microcontroller 814 to lookup a second value from a lookup table stored in the memory or to calculate a second value based on a formula. In more detail, if there are 2.1 seconds left when the microcontroller 814 receives an electrical signal from the limit switch (e.g., indicating that the motor is moving the security device 810 to its lower position faster than expected), the microcontroller 814 may reference a second value of 1.3 in a stored lookup table and continue to drive a motor for 1.3 more seconds to place the security device 810 in its lower position. However, if there are 1.1 seconds left when the microcontroller 814 receives an electrical signal from the limit switch (e.g., indicating that the motor is moving the security device 810 to its lower position slower than expected), the microcontroller 814 may reference a different value of 1.8 in a stored lookup table and continue to drive a motor for 1.8 more seconds to place the security device 810 in its lower position.

In some implementations, the security device 810 includes a battery that powers the one or more actuators 818 and/or the one or more sensors 816. For example, the security device 810 may include a lithium-ion battery positioned within a recess of the body member of the security device 810. As another example, the door security device 810 may include a nickel-metal hydride battery positioned within a housing for a motor of the actuator(s) 818 of the door security device 810 (e.g., the motor housing 930 shown in FIGS. 9A-9E and described below).

In some implementations, the security device 810 includes a wired connection to a power source. For example, the security device 810 may be powered through an connection to an AC wall outlet.

In the example of FIG. 8, the computing system 802 wirelessly transmits lock instructions 806 to the security device 810. For example, the computing system 802 may transmit the lock instructions 806 in response to a notification from one or more of the computing devices 804 that there is an emergency event or a particular type of emergency event (e.g., lockdown event).

The transceiver 812 of the security device 810 receives the lock instruction 806. The lock instruction 806 is transmitted to the microcontroller 814 that is electrically coupled to the transceiver 812. The microcontroller 814 may process the lock instruction 806 and output commands for the one or more actuators 818 that is/are electrically coupled to the microcontroller 814. In response to these commands, the one or more actuators 818 drive the door security device 810 from an upper, unsecure position (e.g., door security device 810*a*) to a lower, secure position (e.g., door security device 810*b*).

The one or more sensors 816 may detect once the door security device 810 has reached its lower, secure position and, in response, produce a signal indicating the detection. The detection signal is received by the microcontroller 814 that is electrically coupled to the one or more sensors 816. In response to receiving the detection signal, the microcontroller 814 generates a lock confirmation signal 808 that is then provided to the transceiver 812 for transmission. The lock confirmation signal 808 may include information that identifies the particular door security device 810, the room that the door security device 810 is installed in, and/or the particular door the door security device 810 is installed on.

In some implementations, in response to receiving the lock confirmation 808, the computing system 802 generates and transmits notifications to one or more of the computing devices 804. As an example, the notification may read "Classroom C of School A was successfully secured."

In some implementations, the system 800 incorporates an audio monitoring component. For example, the system 800 may include one or more microphones designed to record ambient decibel levels within the building. This audio data may improve the system 800's security matrix. As an example, each of the door security devices 810 may include a microphone as part of the sensor(s) 816.

An example method for setting up the system 800 with an audio monitoring component is described below. In the setup phase of setting up the system 800 in a building, a detailed floor plan of the building may be uploaded to an online configuration tool. Each door security device 810 is then virtually positioned within this plan, allowing the computing system 802 to localize and interlink all of the door security devices 810. This setup facilitates the triangulation of sound sources, utilizing the distance between the door security devices 810 and their respective decibel readings to pinpoint the origin of significant noises, such as potential gunshots. This acoustic triangulation data is further analyzed, for example, by a machine learning algorithm, which is trained to estimate the location of gunshot sounds on the floor plan. This critical information is then conveyed to the computing system 802 and, ideally, to local law enforcement agencies through the external server 804*c*. By cross-referencing this data with the building's schedules (e.g., class schedules) and the current status of each door, the computing system 802 can potentially identify rooms at risk, thereby aiding law enforcement in rapidly focusing their response efforts on the most critical areas.

In some implementations, the door security device 810 does not include an interactive member (e.g., such as the interactive member 210 shown in FIGS. 2A-2E and FIGS. 7A-7C). For example, in implementations where the device 810 includes one or more actuators, the device 810 may not include an interactive member.

In some implementations, the device 810 includes an interactive member and one or more actuators. For example, in implementations, where the device 810 includes a motor, a rack, a pinion, and a battery to power the motor, the device 810 may also include an interactive member to allow users to move the device from an unsecured, upper position to a secured, lower position, or to move the device from a lower position to an upper position (e.g., to prime the device 810). An example, of such as device is described in more detail below with respect to FIGS. 9A-9E.

Figure 9B:
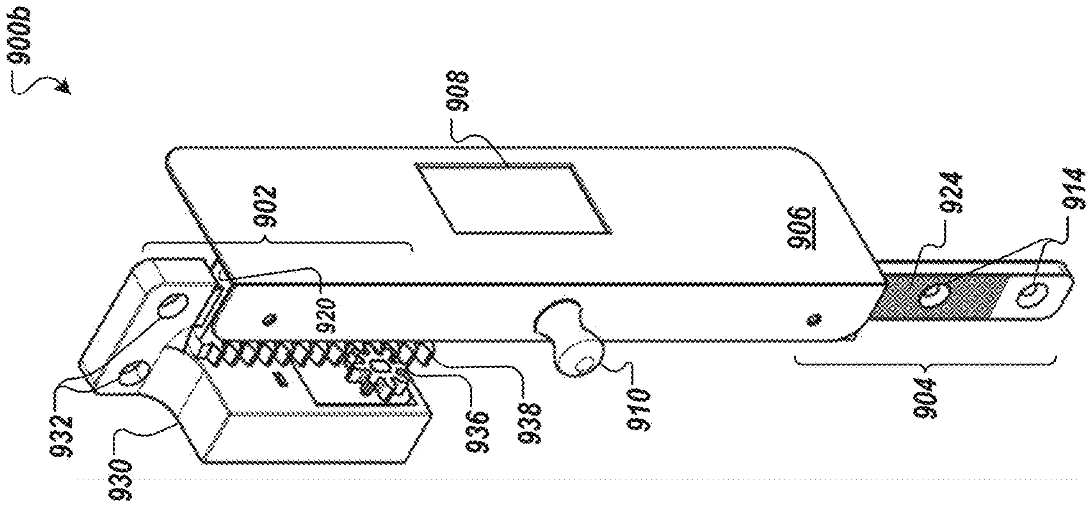
FIGS. 9A-9B are perspective views of an example motorized door security device.
Figure 9A:
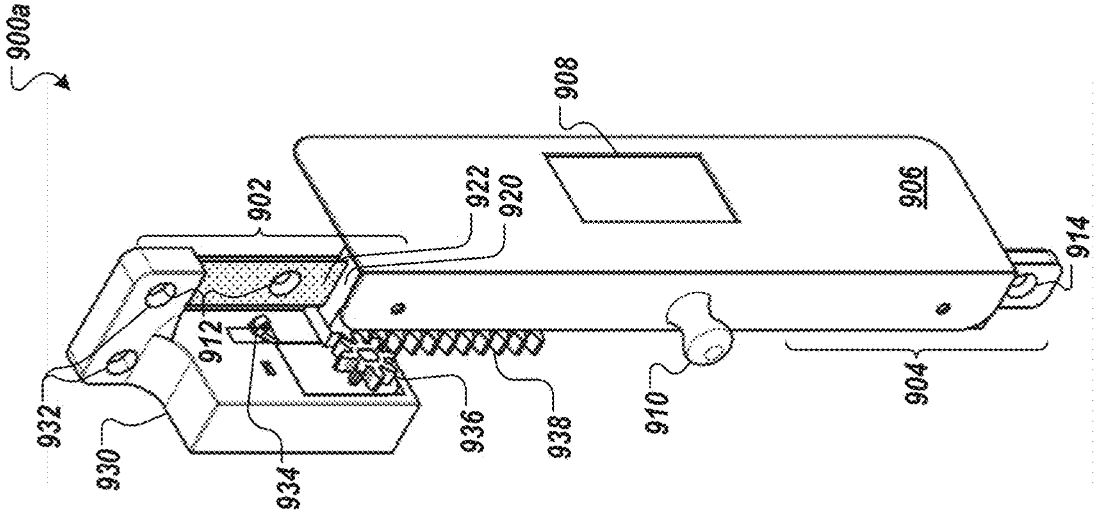

FIGS. 9A-9B are perspective views of an example motorized door security device 900. The door security device 900 includes a body member 920, a plate member 906 coupled to the body member 920, an upper rail member 902, and a lower rail member 904. The rail members 902-904 may each have two openings, 912 and 914 respectively, that are used to secure the rail members 902-904 and the door security device 900, through the rail members 902-904, itself to a door using, for example, a screw or other fastener. Each of the rail members 902-904 includes an elongated portion and an end portion as described in more detail below with respect to FIGS. 10A-10D. The body member 920 of the door security device 900 is configured to receive the elongated portions of the rail members 902-904. The body member 920—and the plate member 906 through the body member 920—of the door security device 900 are moved vertically up and down along the upper rail member 902 and the lower rail member 904 through a rack 938 mechanically coupled to the body member 920 and a pinion 936 driven by a motor.

The motor housing 930 of the door security device 900 may house a motor, such as a DC motor, an AC motor, a stepper motor, or the like. A rotatable end of the motor may be mechanically coupled to the pinion 936 such that the pinion 936 turns when the motor is driven. The motor housing 930 also houses a limit switch 934 that is triggered when the door security device 900 is moved to its lower position and/or when the door security device 900 is moved to its upper position. The motor housing 930 may house other electronics, such as the microcontroller 814 described about with respect to FIG. 8, the transceiver 812 described above with respect to FIG. 8, a battery, and/or memory. The motor housing 930 also includes two openings 932 (one of which is shared with one of the openings 912 of the upper rail member 902) that are used to secure the motor housing 930 and, therefore, the door security device 900 to a door.

In some implementations, the motor housing 930 and the upper rail member 902 are a single piece. The piece may be made out of aluminum (e.g., billet), steel, or another metal through a reductive or additive process. The piece may alternatively be made out of a plastic, such as an injection molded plastic. The motor housing 930 and the upper rail member 902 may be made from multiple sub-components that are coupled together through mechanical or chemical means (e.g., before the door security device 900 is installed).

In some implementations, the motor housing 930 and the upper rail member 902 are separate pieces. For example, an upper portion of the motor housing 930 may include a recess on a back side of the motor housing 930 that faces the door that is configured to receive an end portion of a rail member such that the right opening of the openings 932 of the motor housing 930 aligns with a top opening of the rail member. In this example, the rail member 902 may be the same design as the rail member 904. In more detail, both the upper rail member 902 and the lower rail member 904 may be identical pieces such as the rail member 1000 described in more detail below with respect to FIGS. 10A-10D. The rail members 902-904 made out of aluminum (e.g., billet), steel, or another metal through a reductive or additive process. The rail members 902-904 may alternatively be made out of a plastic, such as an injection molded plastic.

With the door security device 900*a* in the lower position as shown in FIG. 9A, the body member 920 fully or substantially fully receives the elongated portion of the lower rail member 904 and may contact (e.g., rests upon) a lower end portion of the lower rail member 904. In this position, a secure indicator 922 (e.g., green plate or sticker) is revealed, communicating to persons in a room where the door security device 900*a* is installed that the door security device 900*a* is in its secured, lower position. In this position, the limit switch 934 is released such that a portion of the switch 934 swings out outside of the housing. This portion of the limit switch may interact with the rack 938 and/or the body member 920 when the door security device 900 is moved to its upper position, such that this portion of the limit switch 934 is forcefully swung back inside the motor housing 930. This event may result in the limit switch 934 generating an electric signal that is, for example, transmitted to a microprocessor of the door security device 900 (e.g., microcontroller 814 described above with respect to FIG. 8).

With the door security device 900*b* in the upper position as shown in FIG. 9B, the body member 920 fully or substantially fully receives the elongated portion of the upper rail member 902 and may contact an upper end portion of the upper rail member 902. In this position, an unsecure indicator 924 (e.g., red plate or sticker) is revealed, communicating to persons in a room where the door security device 900*b* is installed that the door security device 900*b* is in its unsecured, upper position. In this position, the limit switch 934 is compressed such that the limit switch 934 is enclosed by the motor housing 930 and the rack 938. The limit switch 934 may be triggered or engaged when the door security device 900 is moved to its lower position, such that a portion of the limit switch 934 is allowed to swing outside of the motor housing 930. This event may result in the limit switch 934 generating an electric signal that is, for example, transmitted to a microprocessor of the door security device 900 (e.g., microcontroller 814 described above with respect to FIG. 8).

The motor housing 930 may include a first opening to allow a portion of a motor to engage with the pinion 936. The motor housing 930 may also include a second opening to allow a portion of the limit switch 934 to swing in and out of as the door security device 900 is moved between its upper and lower position.

Figure 9E:
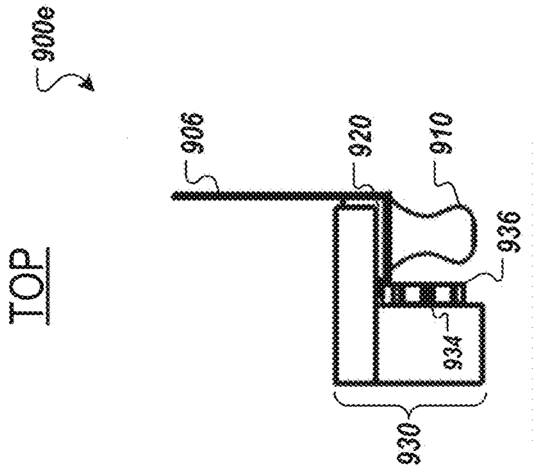
FIG. 9E is a top view of an example motorized door security device.
Figure 9D:
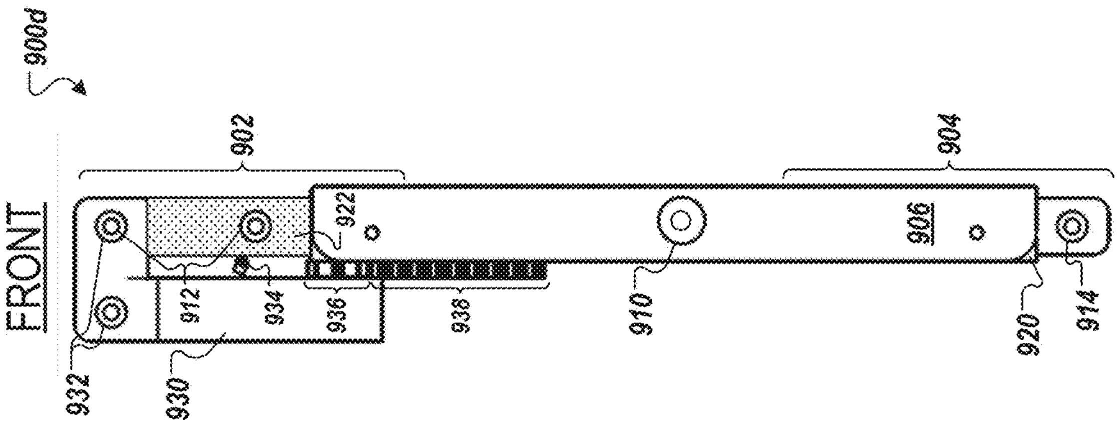
FIG. 9D is a front view of an example motorized door security device.
Figure 9C:
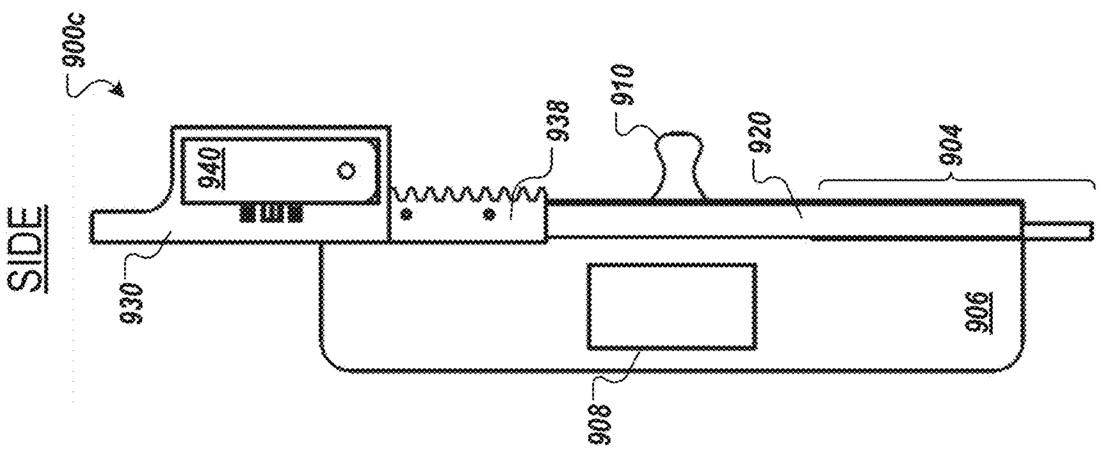
FIG. 9C is a side view of an example motorized door security device.

FIG. 9C is a side view of an example motorized door security device 900*c*. The door security device 900*c* is shown in its secure, lower position. As shown, the rack 938 is secured to the body 920 of the door security device 900*c*. The rack 938 may be secured to the body 920, for example, using one or more fasteners, such as pins, screws, or the like.

FIG. 9D is a front view of an example motorized door security device 900*d*. The door security device 900*d* is shown in its secure, lower position with the limit switch 934 released.

FIG. 9E is a top view of an example motorized door security device 900*e*. The door security device 900*e* is shown in its secure, lower position with the limit switch 934 released.

As an example, the description of the body member 220 described above with respect to FIGS. 2A-2E and 5A-5D is applicable to the body member described above with respect to FIGS. 9A-9E.

As an example, the description of the plate member 206 and its opening 208 described above with respect to FIGS. 2A-2E and 6A-6D is applicable to the plate member 906 and its opening 908 described above with respect to FIGS. 9A-9E.

As an example, the description of the interactive member 210 described above with respect to FIGS. 2A-2E and 7A-7C is applicable to the interactive member 910 described above with respect to FIGS. 9A-9E.

Figures 10A, 10B, 10C, 10D:
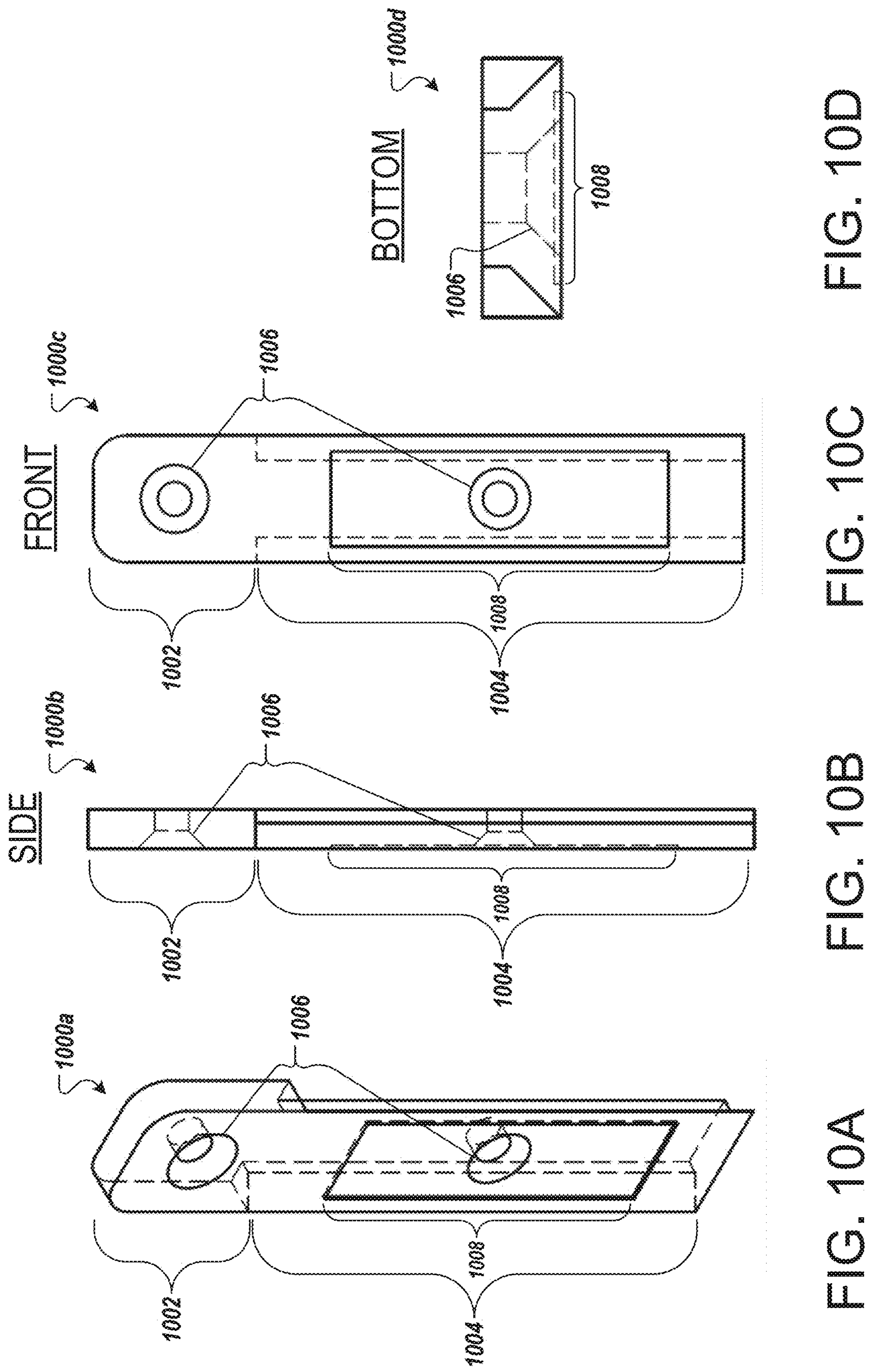
FIG. 10A is a perspective view of an example rail member of a door security device.
FIG. 10B is side view of an example rail member of a door security device.
FIG. 10C is a front view of an example rail member of a door security device.
FIG. 10D is a bottom view of an example rail member of a door security device.

FIG. 10A is a perspective view of an example rail member 1000*a* of a door security device. The rail member 1000*a* includes an end portion 1002 and an elongated portion 1004.

As an example, the cross-section of the elongated portion 1004 has a polygon shape that has larger width at front side of the rail member (e.g., facing away from a door when the rail member 1000*a* is installed on a door) than a width at a back side of the rail member (e.g., facing and/or contacting a door when the rail member 1000*a* is installed on a door). Having a larger width on the front side than on the back side allows the rail member 1000*a* to hold a body member of a door security device (e.g., the body member 920 of the door security device 900 described above with respect to FIGS. 9A-9E) to a door once installed by, for example, preventing the body member and the other components of the door security device from being pulled off the rail in direction perpendicular to the door and/or the front side of the rail member 1000*a*. The polygon shape may include a trapezoidal portion and a rectangular portion as shown. Alternatively, the polygon shape may be a trapezoidal shape. Various other cross-section shapes are possible.

As an example, the cross-section of the elongated portion 1004 and one or more corresponding recesses of a body member of a door security device (e.g., the body member 920 of the door security device 900 described above with respect to FIGS. 9A-9E) may be configured such that the elongated portion 1004 can enter the one or more corresponding recesses (e.g., to provide a sliding fit which may be a clearance fit or a transition fit).

As an example, the cross-section of the end portion 1002 has a polygon shape different from that of the cross-section of the elongated portion 1004. For example, the cross-section of the end portion 1002 may be rectangular. The different cross-section shape of the end portion 1002 may be configured to prevent the end portion of the rail member 1000*a* from entering a corresponding recess of a body member of a door security device (e.g., the body member 920 of the door security device 900 described above with respect to FIGS. 9A-9E) to, for example, prevent the body member and various other components of the door security device from falling off the door.

As an example, the rail member 1000*a* may replace the lower rail member 204 of the door security device 110 described above with respect to FIGS. 2A-2E. When the door security device 110 is placed in its lower position, the elongated portion 1004 of the rail member 1000*a* may fully enter a corresponding lower recess of the body member 220. However, the shape of the recess may be such to prevent the shape of the cross-section of the end portion 1002 of the rail member 1000*a* from entering the recess. This would have the benefit of preventing the body member 220 and various other components of the door security device 110 from falling off the rail members and the door, as the body member 220 of the door security device would come to rest on the end portion 1002 of the rail member 1000*a*.

As an example, the rail member 1000*a* includes two openings 1006. The openings 1006 allow the rail member 1000*a* to be secured to a door using one or more fasteners, such as screws, pins, nails, bolts, or the like. The openings 1006 may have a conical or partially conical shape such that an opening at the front side of the rail member 1000*a* has a larger diameter than at the back side of the rail member 1000*a*. This feature may allow the openings 1006 to catch a head of the fastener while allowing the head of the fastener to sit flush or substantially flush with the front side of the rail member 1000*a*, thereby preventing the fasteners from undesirably interacting with other components of the door security device such as the body member 920 of the door security device 900 described above with respect to FIGS. 9A-9E when the body member 920 is moved up and down along rail members.

As an example, the rail member 1000*a* includes a shallow (e.g., less than 3 mm deep, less than 2 mm deep, less than 1 mm deep, less than 0.5 mm deep, etc.) recess 1008 that is configured to receive an indicator. The indicator may be a sticker, plate, paint, or the like is used to indicate whether the door security device that uses one or more of the rail members 1000*a* is in its upper or lower position. For example, the indicator may be a green sticker that is placed in the recess 1008 when the rail member 1000*a* is used as an upper rail member of a door security device to indicate that the door security device is in its secured, lower position. As another example, the indicator may be a red sticker that is placed in the recess 1008 when the rail member 1000*a* is used as a lower rail member of a door security device to indicate that the door security device is in its unsecured, upper position. Various types of indicators may be placed in the recess 1008.

In some implementations, the indicator that is placed in the recess 1008 is the indicator 922 described above with respect to FIGS. 9A an 9D.

In some implementations, the indicator that is placed in the recess 1008 is the indicator 924 described above with respect to FIG. 9B.

In some implementations, the indicator that is placed in the recess 1008 is the indicator 112 described above with respect to FIGS. 2A-2B, 2E, 3A, and 3C.

In some implementations, the indicator that is placed in the recess 1008 is the indicator 114 described above with respect to FIGS. 4A and 4C.

As an example, the description of the indicators 112 and 114 described above with respect to FIGS. 2A-2E, 3A-3C, and 4A-4C is applicable to an indicator that can be placed in the recess 1008 of the rail member 1000*a*.

As an example, the description of the indicators 922 and 924 described above with respect to FIGS. 9A-9B and 9D is applicable to an indicator that can be placed in the recess 1008 of the rail member 1000*a*.

FIG. 10B is side view of an example rail member 1000*b* of a door security device. As shown, the rail member 1000*b* includes the end portion 1002, the elongated portion 1004, the openings 1006, and the recess 1008 described above with respect to FIG. 10A.

FIG. 10C is a front view of an example rail member 1000*c* of a door security device. As shown, the rail member 1000*c* includes the end portion 1002, the elongated portion 1004, the openings 1006, and the recess 1008 described above with respect to FIG. 10A.

FIG. 10D is a bottom view of an example rail member 1000*d* of a door security device. As shown, the rail member 1000*d* includes the openings 1006 and the recess 1008 described above with respect to FIG. 10A. The different cross-section shapes of the elongated portion 1004 of the rail member 1000*d* and the end portion of the rail member 1000*d* are clearly visible in this view.

In some implementations, the upper rail member 902 of the motorized door security device 900 described above with respect to FIGS. 9A-9D is the rail member 1000 described above with respect to FIGS. 10A-10D.

In some implementations, the lower rail member 904 of the motorized door security device 900 described above with respect to FIGS. 9A-9D is the rail member 1000 described above with respect to FIGS. 10A-10D.

In some implementations, one or more of the upper and lower rail members 202-204 of the door security device 110 described above with respect to FIGS. 2A-2E, 3A-3C, and 4A-4C is/are replaced with the rail member 1000 described above with respect to FIGS. 10A-10D.

In some implementations, the upper and lower rail members 202-204 of the door security device 110 described above with respect to FIGS. 2A-2E, 3A-3C, and 4A-4C are replaced with the rail member 1000 described above with respect to FIGS. 10A-10D.

Figure 11C:
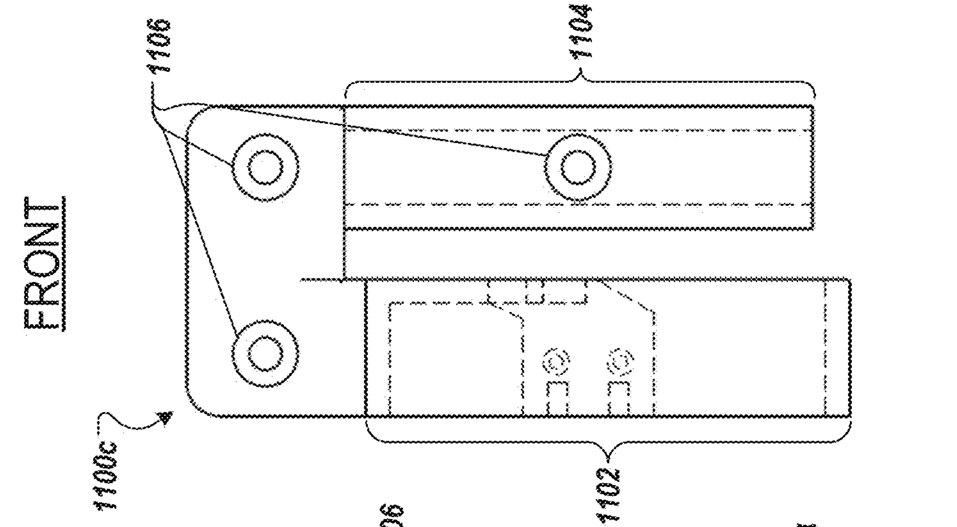
FIG. 11C is a front view of an example component of a door security device.
Figure 11B:
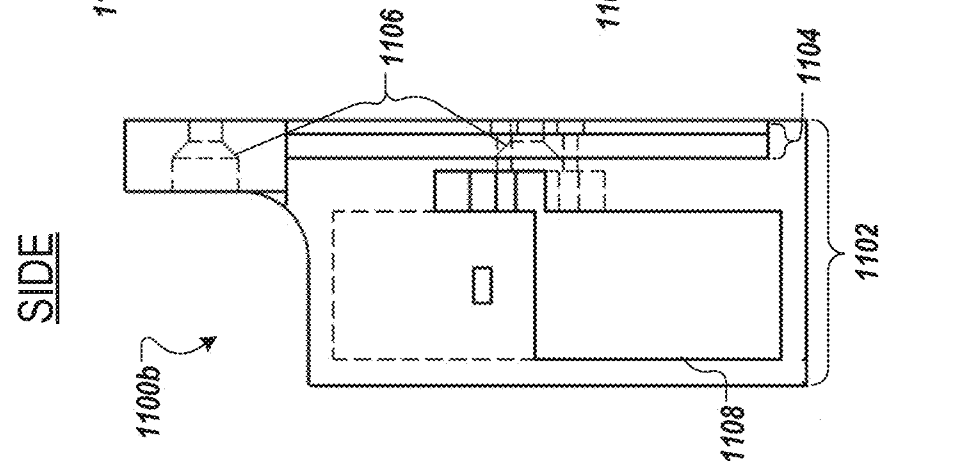
FIG. 11B is a side view of an example component of a door security device.
Figure 11A:
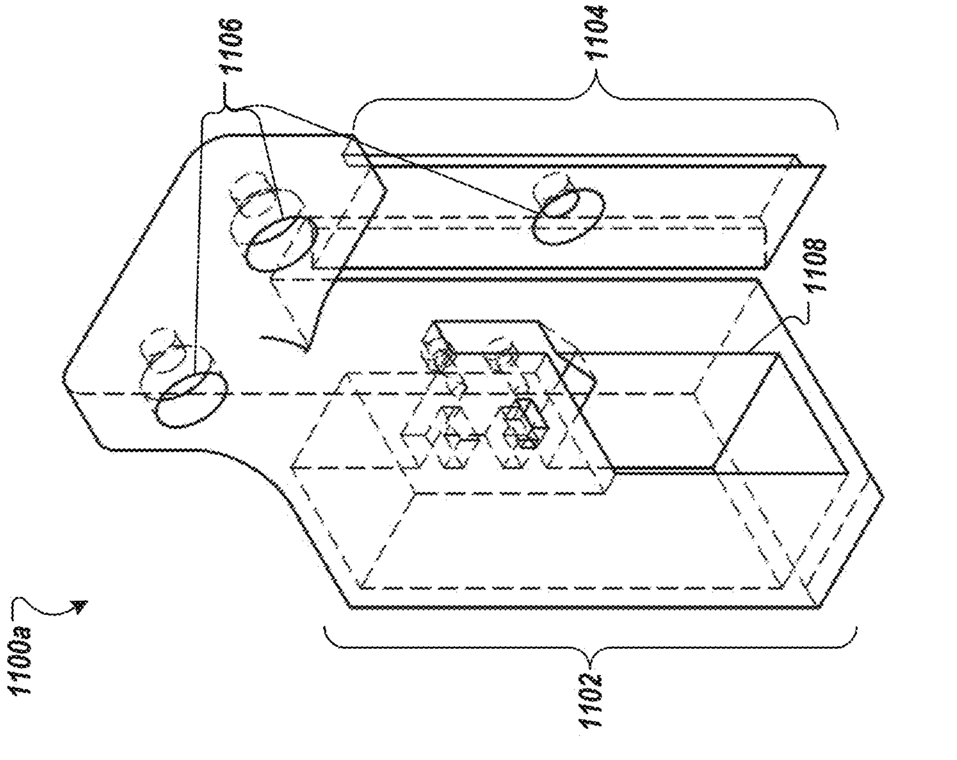
FIG. 11A is a perspective view of an example component of a door security device.

FIG. 11A is a perspective view of an example component 1100*a* of a door security device. The component 1100*a* is a combination motor housing and upper rail member for a motorized door security device, such as for the door security device 810 described above with respect to FIG. 8 and the door security device 900 described above with respect to FIGS. 9A-9E. In some implementations, the component 1100*a* is or replaces the motor housing 930 and the upper rail member 902 of the door security device 900 described above with respect to FIGS. 9A-9E.

As an example, the component 1100*a* includes a motor housing portion 1102 that would house electrical components of a motorized door security device. For example, the motor housing portion 1102 may house a motor (e.g., DC motor, stepper motor, etc.) and one or more sensors (e.g., limit switch, microphone, etc.). The motor housing portion 1102 may also house other electrical components, such as a transceiver, a microcontroller or microprocessor, a battery, or the like.

As an example, there is an opening 1108 in the motor housing portion 1102 that allows components housed by the motor housing portion 1102 to interact with other components of a motorized door security device. For example, the opening 1108 may have a larger part that allows a motor to drive a pinion of a rack and pinion actuator. The opening 1108 may also have a smaller part that allows a switch such as a limit switch to swing out of the motor housing portion 1102 (undepressed) or pushed into the motor housing portion 1102 (depressed).

As an example, the component 1100*a* includes an upper rail member portion 1104 configure to enter a recess of a body member of a motorized door security device. For example, the upper rail member portion 1104 may be shaped and sized such that it fits into a corresponding recess formed in top surface and back surface of the body member 920 of the door security device 900 described above with respect to FIGS. 9A-9E. The upper rail member portion 1104 may have a cross-section that is the same or is substantially the same as the cross-section of the elongated portion of the rail member 1000 described above with respect to FIGS. 10A-10D.

As an example, the component 1100*a* includes multiple openings 1106 to secure the component 1100*a* to a door using fasteners. The fasteners may enter the openings 1106. These fasteners may include screws, nails, pins, bolts, or the like. The width or diameter of the openings 1106 may be larger on a front side of the component 1100*a* than on a backside of the component 1100*a* to catch a head of the fasteners and to permit the heads of the fasteners to sit flush or substantially flush with a front side (e.g., the front surfaces) of the component 1100*a*.

FIG. 11B is a side view of an example component 1100*b* of a door security device. The component 1100*b* includes the motor housing portion 1102 with its opening 1108, the upper rail member portion 1104, and the openings 1106 as described above with respect to FIG. 10A.

FIG. 11C is a front view of an example component 1100*c* of a door security device. The component 1100*c* includes the motor housing portion 1102, the upper rail member portion 1104, and the openings 1106 as described above with respect to FIG. 10A.

Figure 12:
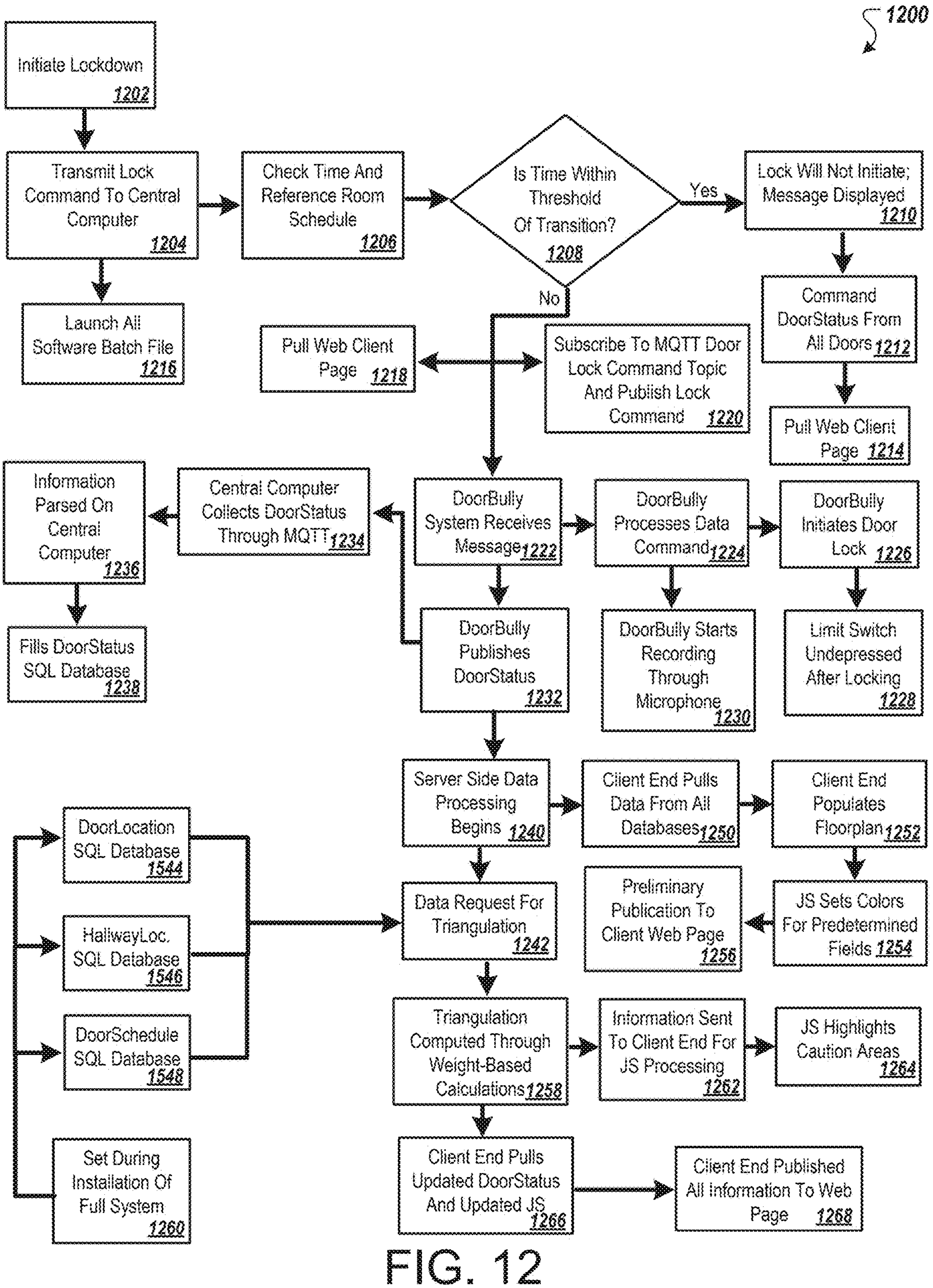
FIG. 12 is a flow chart depicting an example process for operating a system that includes one or more motorized door security devices.

FIG. 12 is a flow chart depicting an example process 1200 for operating a system that includes one or more motorized door security devices. For example, each of the one or more door security devices may be the door security device 810 described above with respect to FIG. 8 or the door security device 900 described above with respect to FIGS. 9A-9E. The process 1200 may be performed, for example, by the system 800 described above with respect to FIG. 8. As an example, the process 1200 may be performed all or in part by the computing system 802 described above with respect to FIG. 8. As an example, the process 1200 may be performed all or in part by the door security device 810 described above with respect to FIG. 8.

The process 1200 includes initiating a lockdown (1202). For example, a front office of the building may trigger the lockdown protocol, which is likely a response to a recognized threat or intruder. This is done through a button system that is connected to the Network and is non-reliant on grid power.

The process 1200 includes transmitting a lock-command to the central computer (1204). A command is sent to the central computer system (e.g., the computing system 802) to initiate the lockdown process. The command may be sent by a computing device, such as one of the computing devices 804 described above with respect to FIG. 8. This begins the long process of Data-Driven Decision making.

The process 1200 includes checking time and referencing a schedule (1206). The system checks the current time and references it against a schedule (e.g., class schedule) to determine if the lockdown should proceed. Schedules are set during the setup process of the door security device system (e.g., "DoorBully System") on site.

The process 1200 includes a determination of whether the time is within a threshold of transition (1208). The threshold may be, for example, two minutes, one minute, etc. For example, the computing system 802 evaluates if the current time is within two minutes of a class transition period. This is done to determine if it is in the best interest of the Facility and Students to initiate a lockdown command.

The process 1200 includes Lock Will Not Initiate; Message Displayed (1210). If the time is within a transition period, the lockdown will not initiate to avoid disruption, and a message is displayed to inform the relevant parties and on the Central Computer.

The process 1200 includes commanding DoorStatus from all doors (1212). A command is issued to all doors on the network through the DoorStatus channel to begin sending information. Used to ensure the monitoring feature still functions, despite the doors not automatically locking down.

The process 1200 includes pulling a web client page (1214). Here, the system (e.g., the computing system 802) pulls and starts Web Serve Page in a secure manner. This is done to, for example, allow for JavaScript to publish to this page later and ensure adequate time for the webpage to startup.

The process 1200 includes launching a software batch file (1216). For example, the computing system 802 may run a series of pre-programmed tasks or scripts as part of the lockdown procedure. This may be initiated once Lockdown Button pressed (1202). This may prime all door security devices and helps to retain battery life on mobile door security devices (e.g., "DoorBully devices").

The process 1200 includes pulling a web client page (1218). For example, the computing system 802 pulls and starts Web Serve Page in a secure manner. This may be done to allow for JavaScript to publish to this page later and ensure adequate time for the webpage to startup.

The process 1200 includes publishing the lock command through MQTT (1520). For example, the central computer (e.g., the computing system 802 described above with respect to FIG. 8) has already subscribed to MQTT DoorLock Command Topic and will now publish on this topic to command all doors in the Network to lockdown.

The process 1200 includes the system receiving a message (1222). For example, each door security device (e.g., the door security device 810 described above with respect to FIG. 8) of the system receives the DoorLock Command. This begins the data processing and action phase controlled by the microcontroller (e.g., the microcontroller 814 described above with respect to FIG. 8) found within the door security device.

The process 1200 includes the door security device(s) processing a data command (1224). For example, before the door security device(s) (e.g., the door security device 810 described above with respect to FIG. 8) process a lock command, it ensures that the command was from a whitelisted user and that the encrypted key matches that of the one saved on the system (e.g., the computing system 802 described above with respect to FIG. 8). This is done to only allow the central computer (e.g., the computing system 802 described above with respect to FIG. 8) to lock down doors.

The process 1200 includes the door security device(s) initiate door lock (1226). For example, after processing the data command to verify the command, the door security device(s) (e.g., the door security device 810 described above with respect to FIG. 8) initiate a door lock sequence to move the door security device(s) from an unsecured, upper position to a secured, lower position.

The process 1200 includes a switch triggering (1228). For example, a limit switch may be triggered after it is undepressed when a door security device (e.g., the door security device 810 described above with respect to FIG. 8) is moved to its secured, lower position. In more detail, after the lock procedure for the door security device(s) is initiated, the rack and pinon of each device lowers and moves the device down causing the limit switch to be undepressed. This information will be relayed to accurately show the Door Lock Status.

The process 1200 includes the door security device(s) starting recording through microphone (1230). For example, the door security device(s) (e.g., the door security device 810 described above with respect to FIG. 8) start recording through their microphones at the same time the Door Lock Command is confirmed and/or the door locking is initiated. The system (e.g., the system 800, the computing system 802, and/or the door security device 810 described above in FIG. 8) starts to measure decibel levels for later triangulation processes.

The process 1200 includes the door security device(s) publishing their door status (1232). For example, each of the door security devices may package information from both the limit switch and the decibel readings into a singular packet to send back on the DoorStatus Topic (e.g., as part of the lock confirmation 808 described above with respect to FIG. 8). The packet may also have the room number and current time embedded within for later identification and mapping.

The process 1200 includes a central computer collecting door status information (1234). For example, the computing system 802 described above with respect to FIG. 8 may collect the DoorStatus from each door security device 810 (e.g., based on signals from the limit switch of each door security device 810) using MQTT, a machine-to-machine (M2M) connectivity protocol. However, other connectivity protocols may be used in place of MQTT.

The process 1200 includes parsing information on the central computer (1236). For example, the computing system 802 described above with respect to FIG. 8 may parse through the data as it is handling a large load of information transferred over one singular topic.

The process 1200 includes filling a door status database (1238). For example, the computing system 802 described above with respect to FIG. 8 may fill a DoorStatus SQL Database where the information about the door statuses is stored in an SQL database for record-keeping and further action. The database may be updated by the computing system 802 every time a new status message (e.g., lock confirmation 808) is received.

The process 1200 includes beginning server-side data processing (1240). For example, a server may begin processing the data received as part of the lockdown protocol. This begins the process of all server-side calculations. The system 800 may include one or more servers to perform this step and/or to perform server-side calculations. Alternatively, this step and/or calculations may be performed by the computing system 802 which may or may not include one or more servers.

The process 1200 includes requesting data for triangulation (1242). For example, the computing system 802 described above with respect to FIG. 8 and/or a server may request for data to help determine the location of an intruder of a building through triangulation techniques.

The process 1200 includes referencing a door location database (1244). For example, the computing system 802 described above with respect to FIG. 8 and/or a server may reference a DoorLocation SQL database containing the locations of doors within the building.

The process 1200 includes referencing a hallway location database (1246). For example, the computing system 802 described above with respect to FIG. 8 and/or a server may reference a HallwayLoc SQL Database containing information about the locations of hallways, likely used to help in the triangulation process.

The process 1200 includes referencing a door schedule database (1248). For example, the computing system 802 described above with respect to FIG. 8 and/or a server may reference a DoorSchedule SQL Database containing schedules for when doors of the building should be locked or unlocked.

The process 1200 includes pulling, from the client end, data from one or more databases (1250). For example, the one or more of the computing devices 804 described above with respect to FIG. 8 may pull data from one or more databases, such as information from a DoorStatus SQL database to allow for processing on the active and current status of each door. Here the information may be cross-referenced with class schedules to determine classroom safety rating used later. In some implementations, the pulling, from the client end, data from one or more databases includes pulling data from multiple databases. In some implementations, the pulling, from the client end, data from one or more databases includes pulling data from all available databases.

The process 1200 includes populating a floorplan from the client end (1252). For example, a user of the one or more of the computing devices 804 described above with respect to FIG. 8 may populate a floorplan for the building. Taking the data processing from the previous step, a color may be assigned for every door automatically (e.g., by the computing system 802) and/or manually by a client end user. If information is unavailable, no color will be uploaded.

The process 1200 includes populating a door schedule database (1254). For example, a user of the one or more of the computing devices 804 described above with respect to FIG. 8 may upload the door schedules for the building to populate a DoorSchedule SQL database. JavaScript may take the data from the DoorStatus SQL and assign each color to the corresponding box on the visualization, floorplan, on the client end.

The process 1200 includes preliminary publishing to a client accessible web page (1256). As an example, the web page may not be fully populated with visualization at this point as the triangulation is not complete. However, a preliminary version is updated for first responders and local facility.

The process 1200 includes computing triangulation through weight-based calculations (1258). As an example, the computing system 802 described above with respect to FIG. 8 and/or a sever pulls the data of the decibel readings from a database. In addition, the information about relative position between the door security device(s) are pulled by the computing system 802 and/or the sever. Here the system (e.g., the system 800, the computing system 802, and/or a server) uses weight-based triangulation to predict the relative location as a point of where the active threat is located in the building.

The process 1200 includes performing setup during installation of full system (1260). For example, all information, including door location information (e.g., from a DoorLocation SQL database), hallway location (e.g., from a HallwayLoc. SQL database), and door schedule (e.g., from a DoorSchedule SQL database) information, is setup during installation of the door security device system (e.g., the system 800 described above with respect to FIG. 8). The information may be refreshed every time new information comes available, such as when a schedule change occurs or when an addition is made to a building.

The process 1200 includes sending information to client end for processing (1262). For example, the computing system 802 described above with respect to FIG. 8 and/or a sever may send information (e.g., triangulation information) to one or more of the computing devices 804 for JavaScript processing. The JavaScript may identify the closest hallway location to the predicated caution area based on the information, such as on triangulation information.

The process 1200 includes highlighting caution areas in the building (1264). For example, after the JavaScript identifies a hallway that is possible danger exist within the building, the JavaScript will highlight the area and this information will be pushed to the client end (e.g., to the computing devices 804 described above with respect to FIG. 8).

The process 1200 includes pulling, from the client end, updated door status information (1266). For example, one or more of the computing devices 804 may pull updated DoorStatus information that is used to update the JavaScript to ensure that the client end has the most up-to-date information. The one or more computing devices 804 may request updated information at a set interval, such as every five seconds or every three seconds during the entire lockdown procedure.

The process 1200 includes publishing all information to a web page (1268). For example, one or more of the computing devices 804 may publish the most up-to-date information to a webpage and/or the computing system 802 may publish the most up-to-date information to a webpage that is accessible by the computing devices 804. This allows those who require the information to have the most up-to-date information as possible.

Figure 13:
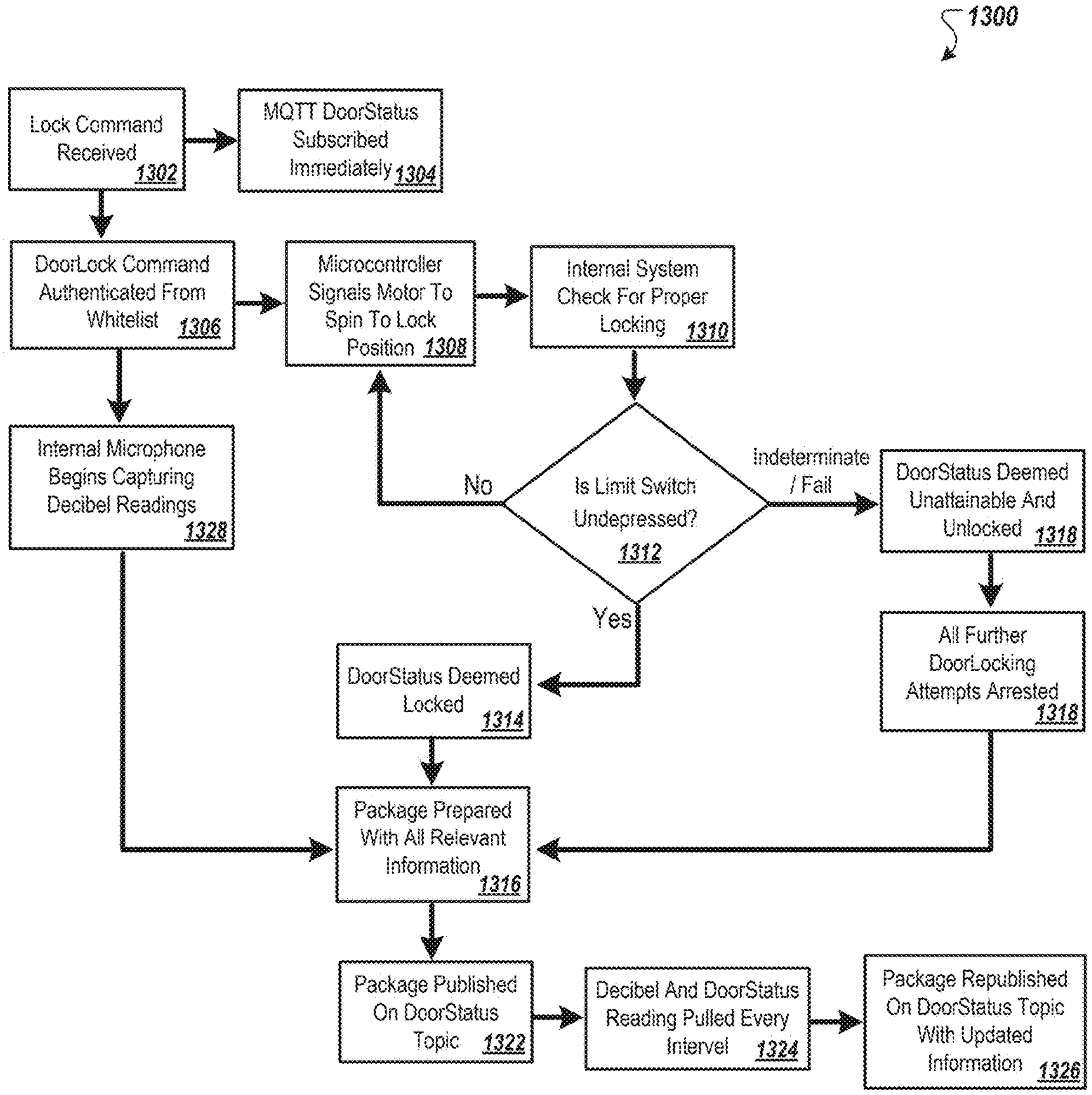
FIG. 13 is a flow chart depicting an example process for operating an electrical system of a motorized door security device.

FIG. 13 is a flow chart depicting an example process 1300 for operating an electrical system of a motorized door security device. For example, all or part of the process 1300 may be performed by the door security device 810 described above with respect to FIG. 8. For example, part of the process 1300 may be performed by the computing system 802 described above with respect to FIG. 8

The process 1300 includes receiving a lock command (1302). For example, the door security device 810 described above with respect to FIG. 8 may receive a command on the DoorLockCommand Topic from an unidentified user. The topic is restricted until authentication is completed by the door security device 810 and/or the computing system 802.

The process 1300 includes subscribing to a door status topic (1304). For example, the door security device 810 described above with respect to FIG. 8 may subscribe immediately or substantially immediately to a MQTT DoorStatus in a preemptive action as this has no trigger on whether the door is locked. However, this allows for information to be relayed to the central computer (e.g., the computing system 802 described above with respect to FIG. 8) at a faster rate. This is action will be reversed later if the Authentication fails and Lock Command is not from a confirmed user.

The process 1300 includes authenticating a door lock command (1306). For example, the door security device 810 and/or the computing system 802 described above with respect to FIG. 8 may authenticate the received DoorLock Command using a whitelist (e.g., whitelist of verified users). An encrypted authentication code may be used to ensure that any command is legitimate and from an authenticated user. This is done to ensure that the system is not misused. Not strictly needed as system has whitelisted users to publish messages and on a private network.

The process 1300 includes signaling motor to spin to a lock position (1308). For example, the microcontroller 814 of the door security device 810 as described above with respect to FIG. 8 may signal a motor of the door security device 810 to spin to its lock position after the microcontroller 814 and/or the computing system 802 authenticates the Lock Command. The microcontroller 814 may signal the motor to spin for a particular amount of time (e.g., for a DC motor) and/or for a number of steps (e.g., for s stepper motor). This may be done using basic DC motors and an inbuilt transistor system to slim down the size opting away from a motor controller.

The process 1300 includes checking internal system for proper locking (1310). For example, the door security device 810 as described above with respect to FIG. 8 will attempt to authenticate the locking procedure to ensure that the Lock Command was successful and the door is now secure. The door security device 810 may use signals from the one or more sensors 816 to check for proper locking, such as signals from a limit switch.

The process 1300 includes determining whether a limit switch is undepressed (1312). For example, determining whether proper locking has occurred, the door security device 810 may check the status of a limit switch that is depressed if the door is not fully locked. The signals from the limit switch may indicate that the door was properly locked (e.g., "yes"), the door was not properly locked (e.g., "no"), or are indeterminate (e.g., "indeterminate/fail").

The process 1300 includes deeming the door status locked (1314). For example, based on signals from a limit switch of the door security device 810 described above with respect to FIG. 8, the door security device 810 may deem that the limit switch is undepressed, meaning the door has fully locked down. The door security device 810 may update its DoorStatus to Locked, e.g., within its internal memory or may transmit information indicating the status to the computing system 802.

The process 1300 includes generating a package containing relevant information (1316). For example, the door security device 810 described above with respect to FIG. 8 may prepare an information package that includes the DoorStatus, the decibel reading at that time, a time stamp of when the decibel reading was taken, and lastly, the room identifier to be used by the central computer for proper parsing and population of the SQL databases. The package (e.g., lock confirmation 808) may be sent to the computing system 802 using the transceiver 812 of the door security device 810.

The process 1300 includes deeming the door status unattainable and unlocked (1318). As an example, after the door security device 810 described above with respect to FIG. 8 attempts to lock down the door a preset number of times (e.g., three times, four times, five times etc.) before deeming the status unattainable and unlocked. This occurs if there is a mechanical failure or a limit switch sensor failure where data can't be processed. If this occurs DoorStatus is updated to "unattainable."

The process 1300 includes arresting all further door locking attempts (1320). For example, at this stage after the door status (e.g., "DoorStatus") has been deemed "unattainable," the microcontroller 814 of the door security device 810 as described above with respect to FIG. 8 will instruct the motor to no longer attempt to spin to ensure that the failure doesn't alert any possible active threats of the room's particular failure. As the door hasn't fully locked or is not certain of its position the built in indicators will show the status to the faculty member within the room allowing for information to still be relayed to those inside.

The process 1300 includes publishing a package on the door status topic (1322). For example, after the information package (e.g., the lock confirmation 808) is prepared by the door security device 810, the door security device 810 uses its transceiver 812 to transmit the information package to a central computer (e.g., the computing system 802).

The process 1300 includes pulling the decibel and/or door status at set intervals (1324). For example, the computing system 802 described above with respect to FIG. 8 may request the decibel and/or door status from each of the door security devices 810 in the building at set intervals (e.g., every minute, every two minutes, every thirty seconds, etc.). Alternatively, each of the door security devices 810 may transmit this information in an information package at set intervals.

The process 1300 includes republishing the package on door status topic with updated information (1326). For example, the door security device 810 described above with respect to FIG. 8 may generate a new package of information to transmit to the computing system 802 with updated information at set intervals or in response to new sensor information (e.g., change in door status, change in decibel reading, etc.).

The process 1300 includes capturing decibel readings using microphone (1328). For example, the door security device 810 described above with respect to FIG. 8 may begin capturing decibel readings using an internal microphone. The door security device 810 may initiate capturing decibel readings at the same or substantially the same time the Door Lock Command is confirmed and/or the door locking is initiated. The measured decibel levels may be used for later Triangulation processes.

Figure 14:
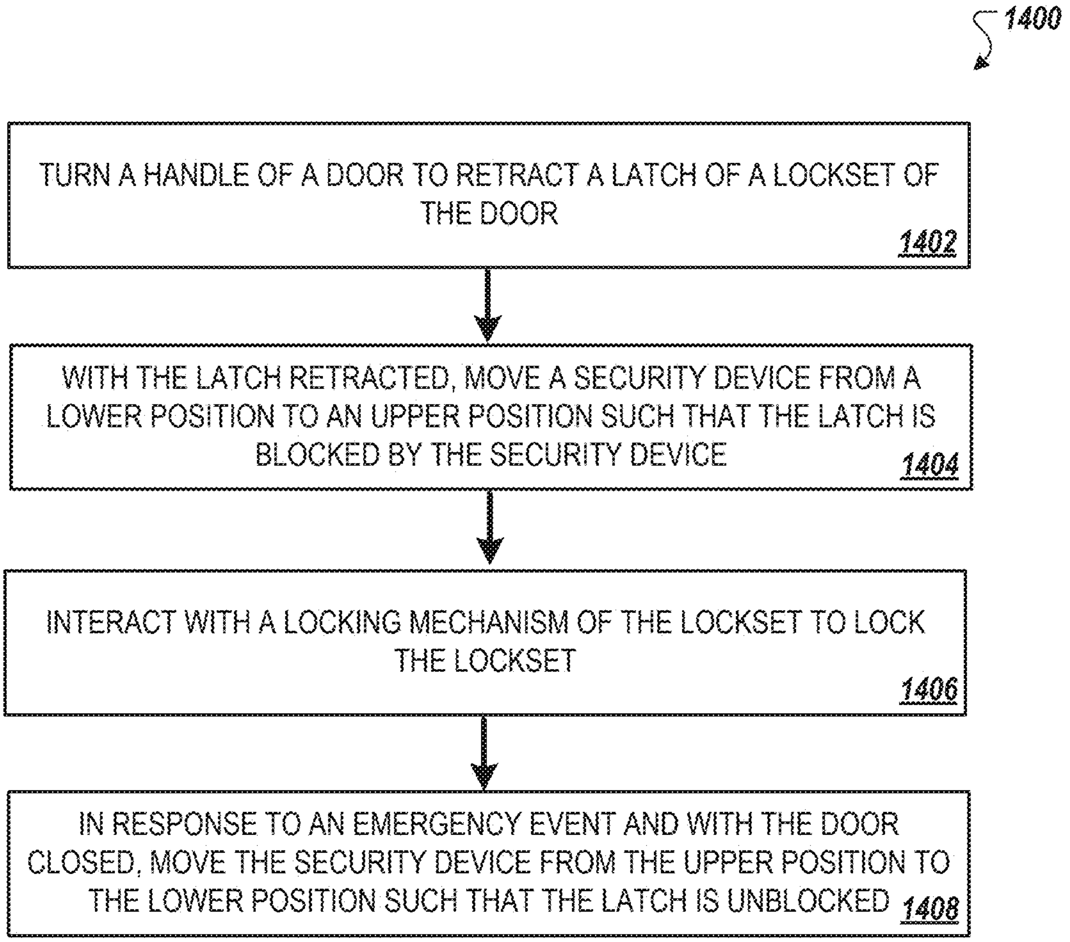
FIG. 14 is a flow chart depicting an example process for using a door security device.

FIG. 14 is a flow chart depicting an example process 1300 for using a door security device. For example, the door security device may be the door security device 110 described above with respect to FIGS. 1A-1C and FIGS. 2A-2E. As another example, the door security device may be the door security device 810 described above with respect to FIG. 8. As another example, the door security device may be the door security device 900 described above with respect to FIGS. 9A-9E.

The process 1400 includes turning a handle of a door to retract a latch of a lockset of the door (1402). For example, with respect to FIG. 1B, a user may turn the handle 104*b* counterclockwise to pull the latch 106 of the lockset 102*c* into the door 108*a*.

The process 1400 includes, with the latch retracted, moving a security device from a lower position to an upper position such that the latch is blocked by the security device (1404). For example, with respect to FIG. 1B, a person may interact with an interactive member (e.g., knob) of the door security device 110 to move the door security device 110 from its lower position (e.g., door security device 110*a*) to its upper position (e.g., door security device 110*b*).

The process 1400 includes interacting with a locking mechanism of the lockset to lock the lockset (1406). For example, with respect to FIG. 1B, a person may interact with the lock selector on the handle 104*c* to move the lock selector from an unlocked position to a locked position to lock the lockset 102*d*.

The process 1400 includes, in response to an emergency event and with the door closed, moving the security device from the upper position to the lower position such that the latch is unblocked (1408). For example, with respect to FIG. 1C, a person may interact with an interactive member (e.g., knob) of the door security device 110 to move the door security device 110 from its upper, unsecure position (e.g., door security device 110*b*) to its lower, secure position (e.g., door security device 110*a*) after the door 108*b* is closed and in response to a lockdown event.

A number of implementations have been described. Nevertheless, it will be understood that various modifications may be made without departing from the spirit and scope of the disclosure. For example, various forms of the flows shown above may be used, with steps re-ordered, added, or removed.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results. As one example, the processes depicted in the accompanying figures do not necessarily require the particular order shown, or sequential order, to achieve desirable results. In some cases, multitasking and parallel performance or processing may be advantageous.

The steps of a method or algorithm described in connection with the embodiments disclosed herein may be embodied directly in hardware, in a software module executed by a processor, or in a combination of the two. A software module may reside in one or more RAM memory, flash memory, ROM memory, EPROM memory, EEPROM memory, registers, hard disk, a removable disk, a CD-ROM, or another form of computer-readable storage medium. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on one or more of any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include single or multiple distinct computers or computing devices (e.g., physical servers, workstations, storage arrays, etc.) that may communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. Specifically, any of the functions of manipulating or processing audio or video information described as being performed by camera devices can be performed by other hardware computing devices.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device to secure a door, the device comprising:

a first rail member having a first elongated portion and secured to a door;

a second rail member having a second elongated portion and secured to the door;

a body member having a front surface, a back surface, a top surface, a bottom surface, and a recess (i) defined by the back surface and one or more of the top surface and the bottom surface and (ii) configured to interact with the first elongated portion of the first rail member and the second elongated portion of the second rail member in a slidable arrangement;

a plate member secured to the body member, the plate member having a through-hole or notch configured to permit at least a portion of a bolt of a lock of the door to pass through the through-hole or the notch;

an interactive member secured to one or more of the plate member and the body member, the interactive member configured to move the plate member and the body member along the first rail member and the second rail member in response to a force applied to the interactive member having a component parallel to an axis of the body member that passes through the top surface and the bottom surface of the body member;

a microcontroller configured to generate and/or process signals; and an actuator mounted to at least one of the first rail member and second rail member and operatively coupled to the body member, wherein the actuator is electronically coupled to the microprocessor, wherein the actuator is configured to change a position of the body member and the plate member with respect to the first rail member and second rail member in response to receiving a signal from the microcontroller.

2. The device of claim 1, wherein:

the elongated portion of the first rail member has a substantially uniform cross-section; and the elongated portion of the second rail member has a substantially uniform cross-section.

3. The device of claim 1, wherein:

the elongated portions of the first and second rail members are shaped such that front surfaces of the elongated portions have a greater width than back surfaces of the elongated portions; and the back surfaces of the elongated portions are opposite the front surfaces and contact the door.

4. The device of claim 3, wherein:

a cross section of the elongated portion of the first rail member is trapezoidal in shape;

a cross section of the elongated portion of the second rail member is trapezoidal in shape;

a cross section of the first recess of the body member is trapezoidal in shape; and a cross section of the second recess of the body member is trapezoidal in shape.

5. The device of claim 1, wherein a length of the body member from the top surface of the body member to the bottom surface of the body member is larger than a width of the body member.

6. The device of claim 1, wherein:

the through-hole of the plate member is configured to permit at least a portion of a bolt of a door lock to pass through the through-hole when the body member and the plate member are positioned in a lower position such that the elongated portion of the second rail member substantially fills the second recess of the body member; and the plate member is configured to prevent any portion of a bolt of a door lock to pass through the plate member when the body member and the plate member are positioned in an upper position such that the elongated portion of the first rail member substantially fills the first recess of the body member.

7. The device of claim 1, wherein the plate member includes a first side that contacts the front surface of the body member and a second side that contacts a side surface of the body member, wherein the first side of the plate member is substantially perpendicular to the second side to the second side of the plate member.

8. The device of claim 7, wherein the through-hole of the plate member is located in the second side of the plate member.

9. The device of claim 7, wherein:

the plate member is formed from a single piece of material that is bent to create the first side and the second side; or the plate member is formed from two or more pieces of material where the first side is formed from a first piece of material and the second side is formed from a second piece of material.

10. The device of claim 1, wherein:

at least a portion of a top surface of the plate member is substantially coplanar with a top surface of body member; and at least a portion of a bottom surface of the plate member is substantially coplanar with a bottom surface of the body member.

11. The device of claim 1, wherein the recess continues through a length of the body member such that the recess is defined by the back, top and bottom surfaces of the body member.

12. The device of claim 1, wherein the recess is a first recess defined by the back and top surfaces of the body member, further comprising a second recess defined by the back and bottom surfaces of the body member, wherein:

a volume of the first recess is substantially the same as a volume of the second recess; and/or dimensions of the first recess are substantially the same as dimensions of the second recess.

13. The device of claim 1, further comprising:

a first indicator to indicate that the body member and the plate member are positioned in a lower position; and a second indicator to indicate that the body member and the plate member are positioned in a second position.

14. The device of claim 13, wherein:

the first indicator is (i) formed in or (ii) secured to a front surface of the elongated portion of the first rail member; and the second indicator is (i) formed in or (ii) secured to a front surface of the elongated portion of the second rail member.

15. The device of claim 13, wherein:

the first indicator has a first color; and the second indicator has a second color different than the first color.

16. The device of claim 1, wherein the plate member is secured to the front member of the body member.

17. The device of claim 1, further comprising:

a transceiver electronically coupled to the microcontroller, wherein the transceiver is configured to receive and transmit signals, including signals generated by the microcontroller; and a sensor electronically coupled to the microcontroller configured to generate a signal in response to the body member and the plate member reaching a lower position such that the elongated portion of the second rail member substantially fills the second recess of the body member.

18. The device of claim 1, wherein the actuator includes:

a motor configured to turn a shaft in response to receiving a signal from the microcontroller;

a pinion torsionally coupled to the shaft of the motor; and a rack that engages the pinion, wherein the rack is mounted to the body member.

19. A device to secure a door, the device comprising:

one or more rail members having a first elongated portion and secured to a door;

a body member having multiple surfaces, and a recess (i) defined by a first set of one or more surfaces of the multiple surfaces and (ii) configured to interact with at least one of the one or more rail members in a slidable arrangement;

a plate member secured to the body member, the plate member having a through-hole or a notch configured to permit at least a portion of a bolt of a lock of the door to pass by the plate member;

a microcontroller configured to generate and/or process signals; and an actuator mounted to at least one of the one or more rail members, and operatively coupled to (i) at least one of the body member and the plate member and (ii) electronically coupled to the microprocessor, wherein the actuator is configured to change a position of the body member and the plate member with respect to the one or more rail members in response to receiving a signal from the microcontroller.

* * * * *